United States Patent
Manthiram et al.

(10) Patent No.: US 9,601,773 B2
(45) Date of Patent: Mar. 21, 2017

(54) ANODE MATERIALS FOR LITHIUM-ION BATTERIES

(71) Applicants: Arumugam Manthiram, Austin, TX (US); Danielle Applestone, Mena, AR (US); Sukeun Yoon, St. Louis, MO (US)

(72) Inventors: Arumugam Manthiram, Austin, TX (US); Danielle Applestone, Mena, AR (US); Sukeun Yoon, St. Louis, MO (US)

(73) Assignee: BOARD OF REGENTS, THE UNIVERSITY OF TEXAS SYSTEM, Austin, TX (US)

(*) Notice: Subject to any disclaimer, the term of this patent is extended or adjusted under 35 U.S.C. 154(b) by 197 days.

(21) Appl. No.: 14/182,338

(22) Filed: Feb. 18, 2014

(65) Prior Publication Data
US 2014/0162125 A1 Jun. 12, 2014

Related U.S. Application Data

(63) Continuation of application No. PCT/US2012/051173, filed on Aug. 16, 2012.
(Continued)

(51) Int. Cl.
*H01M 4/58* (2010.01)
*H01M 4/38* (2006.01)
(Continued)

(52) U.S. Cl.
CPC ............ *H01M 4/58* (2013.01); *B82Y 30/00* (2013.01); *C01G 30/002* (2013.01); *C01G 39/00* (2013.01);
(Continued)

(58) Field of Classification Search
CPC . H01M 4/58; H01M 4/38; H01M 4/48; C01G 30/002; C01G 39/006
(Continued)

(56) References Cited

U.S. PATENT DOCUMENTS

| | | | |
|---|---|---|---|
| 2010/0261059 A1 | 10/2010 | Im et al. | |
| 2012/0080642 A1* | 4/2012 | Ren | H01M 4/38 252/182.1 |

FOREIGN PATENT DOCUMENTS

| | | | |
|---|---|---|---|
| JP | 2005-158305 A | 6/2005 | |
| JP | 2009-110748 | 5/2009 | |

(Continued)

OTHER PUBLICATIONS

Ji Hyun Sung et al., "Amorphized Sb-based composite for high-performance Li-ion battery anodes", Journal of Electroanalytical Chemistry 700, Apr. 17, 2013, pp. 12-16.*
(Continued)

*Primary Examiner* — James Lee
(74) *Attorney, Agent, or Firm* — Baker Botts L.L.P.

(57) ABSTRACT

The current disclosure relates to an anode material with the general formula $M_y Sb\text{-}M'O_x\text{—}C$, where M and M' are metals and $M'O_x\text{—}C$ forms a matrix containing $M_y Sb$. It also relates to an anode material with the general formula $M_y Sn\text{-}M'C_x\text{—}C$, where M and M' are metals and $M'C_x\text{—}C$ forms a matrix containing $M_y Sn$. It further relates to an anode material with the general formula $Mo_3 Sb_7\text{—}C$, where —C forms a matrix containing $Mo_3 Sb_7$. The disclosure also relates to an anode material with the general formula $M_y Sb\text{-}M'C_x\text{—}C$, where M and M' are metals and $M'C_x\text{—}C$ forms a matrix containing $M_y Sb$. Other embodiments of this disclosure relate to anodes or rechargeable batteries containing these materials as well as methods of making these materials using ball-milling techniques and furnace heating.

20 Claims, 28 Drawing Sheets

Related U.S. Application Data

(60) Provisional application No. 61/525,532, filed on Aug. 19, 2011, provisional application No. 61/539,135, filed on Sep. 26, 2011.

(51) Int. Cl.

| | |
|---|---|
| H01M 4/48 | (2010.01) |
| C01G 30/00 | (2006.01) |
| H01M 4/587 | (2010.01) |
| C01G 39/00 | (2006.01) |
| B82Y 30/00 | (2011.01) |
| H01M 4/485 | (2010.01) |
| H01M 4/505 | (2010.01) |
| H01M 4/525 | (2010.01) |
| H01M 10/052 | (2010.01) |

(52) U.S. Cl.
CPC ............ *C01G 39/006* (2013.01); *H01M 4/38* (2013.01); *H01M 4/48* (2013.01); *H01M 4/587* (2013.01); *C01P 2002/72* (2013.01); *C01P 2002/77* (2013.01); *C01P 2004/03* (2013.01); *C01P 2004/04* (2013.01); *C01P 2004/64* (2013.01); *C01P 2006/11* (2013.01); *C01P 2006/40* (2013.01); *H01M 4/485* (2013.01); *H01M 4/505* (2013.01); *H01M 4/525* (2013.01); *H01M 10/052* (2013.01)

(58) Field of Classification Search
USPC ...... 429/220, 231.8, 231.5, 223, 231.6, 224, 429/221; 423/415.1
See application file for complete search history.

(56) References Cited

FOREIGN PATENT DOCUMENTS

| | | |
|---|---|---|
| KR | 10-2009-0041950 A | 4/2009 |
| KR | 10-2010-0113826 A | 10/2010 |
| WO | 2010-138760 A2 | 12/2010 |

OTHER PUBLICATIONS

Chinese Office Action in PRC (China) Patent Application No. 201280049553.5 dated Sep. 25, 2015, 11 pages.
Supplementary European Search Report for Application No. EP 12 82 6331, date of completion of search Feb. 19, 2015, mailed Mar. 2, 2015, 7 pages.
Danielle Applestone et al., "Cu6Sn5—TiC—C nanocomposite alloy anodes with high volumetric capacity for lithium ion batteries", RSC Advances, vol. 2, No. 12, Apr. 13, 2012, p. 5411-5417.
Daniel Applestone et al., "Cu2Sb—Al2O3—C nanocomposite alloy anodes with exceptional cycle life or lithium ion batteries", Journal of Materials Chemistry, vol. 22, No. 7, Jan. 9, 2012, p. 3242-3248.
Sukeun Yoon et al., "Sb-MO x-C (M=Al, Ti, or Mo) Nanocomposite Anodes for Lithium-Ion Batteries", Chemistry of Materials, vol. 21, No. 16, Aug. 25, 2009, pp. 3898-3904.
Sukeun Yoon et al., "Nanostructured SnTiC composite anodes for lithium ion batteries", Electrochimica ACTA, Elsevier Science Publishers, Barking, GB, vol. 56, No. 8, Dec. 30, 2010, pp. 3029-3035.
J.-M. Tarascon, Nat. Chem. 2010, 2, 510.
V. Palomares, P. Serras, I. Villaluenga, K. B. Hueso, J. Carretero-Gonzalez, T. Rojo, Energy Environ. Sci. 2012, 5, 5884-5901.
A. Ponrouch, E. Marchante, M. Courty, J.-M. Tarascon, M. Rosa Palacin, Energy Environ. Sci. 2012, 5, 8572-8583.
X. Lu, G. Xia, J. P. Lemmon, Z. Yang, J. Power Sources, 2010, 195, 2431-2442.
Y. Cao, L. Xiao, W. Wang, D. Choi, Z. Nie, J. Yu, L. V. Saraf, Z. Yang, J. Liu, Adv. Mater. 2011, 23, 3155-3160.
R. Berthelot, D. Carlier, C. Delmas, Nat. Mater. 2011, 10, 74-80.
J. Qian, M. Zhou, Y. Cao, X. Ai, H. Yang, Adv. Energy Mater. 2012, 2, 410-414.
R. Alcantara, M. Jaraba, P. Lavela, J. L. Tirado, Chem. Mat. 2002, 14, 2847-2848.
K. T. Lee, T. N. Ramesh, F. Nan, G. Batton, L. F. Nazar, Chem. Mat. 2011, 23, 3593-3600.
J. F. Whitacre, A. Tevar, S. Sharma, Electrochem. Commun. 2010, 12, 463-466.
Y. Kawabe, N. Yabuuchi, M. Kajiyama, N. Fukuhara, T. Inamasu, R. Okuyama, I. Nakai, S. Komaba, Electrochem. Commun. 2011, 13, 1225-1228.
R. Alcantara, J. M. Jimenez-Mateos, P. Lavela, J. L. Tirado, Electrochem. Commun. 2001, 3, 639-642.
S. Wenzel, T. Hara, J. Janek, P. Adelhelm, Energy Environ. Sci. 2011, 4, 3342-3345.
M. M. Doeff, Y. P. Ma, S. J. Visco, L. C. Dejonghe, J. Electrochem. Soc. 1993, 140, L169-L170.
D. A. Stevens, J. R. Dahn, J. Electrochem. Soc. 2000, 147, 1271-1273.
X. Xia, M. N. Obrovac, J. R. Dahn, Electrochem. Solid St. 2011, 14, A130-A133.
D. Applestone, S. Yoon, A. Manthiram, J. Mater. Chem. 2012, 22, 3242-3248.
D. Applestone, S. Yoon, A. Manthiram, J.Phys. Chem. C 2011, 115, 18909-18915.
S. Yoon, A. Manthiram, Chem. Mat. 2009, 21, 3898-3904.
C.-M. Park, K.-J. Jeon, Chem. Commun. 2011, 47, 2122-2124.
Z. Chen, Y. Cao, J. Qian, X. Ai, H. Yang, J. Mater. Chem. 2010, 20, 7266-7271.
S.-C. Chao, Y.-F. Song, C.-C. Wang, H.-S. Sheu, H.-C. Wu, N.-L. Wu, J. Phys. Chem. C 2011, 115, 22040-22047.
J. Qian, Y. Chen, L. Wu, Y. Cao, X. Ai, H. Yang, Chem. Commun. 2012, 48, 7070-7072.
L. Xiao, Y. Cao, J. Xiao, W. Wang, L. Kovarik, Z. Nie, J. Liu, Chem. Commun. 2012, 48, 3321-3323.
Q. Sun, Q.-Q. Ren, H. Li, Z.-W. Fu, Electrochem. Commun. 2011, 13, 1462-1464.
S. Komaba, T. Ishikawa, N. Yabuuchi, W. Murata, A. Ito, Y. Ohsawa, Acs Appl. Mater. Interfaces, 2011, 3, 4165-4168.
I.T. Kim, E. Allcorn, and A. Manthiram, High-performance MxSb—Al2O3—C (M=Fe, Ni, and Cu) Nanocomposite Alloy Anodes for Sodium-ion Batteries, vol. 1, Issue 5-6, Jun. 2013, 319-326.
International Search Report and Written Opinion of International Application No. PCT/US2012/051173, mailing date Feb. 28, 2013, 10 pages.
International Preliminary Report on Patentability of International Application No. PCT/US2012/051173, mailing date Mar. 6, 2014, 6 pages.
I.T. Kim, E. Allcorn, and A. Manthiram. High performance MxSb—Al2O3—C (M=Fe, Ni, and Cu) Nanocomposite Alloy Anodes for Sodium-ion Batteries, vol. 1, Issue 5-6, Jun. 2013, 319-326.
Office Action from Japanese Patent Application No. 2014-526216, 4 pages, dated Jan. 27, 2016.
Office Action received from Chinese Patent Application No. 201280049553.5; dated Nov. 15, 2016, English translation; 18 pages.
Nie, Ming, et al. "A study of oxygen reduction on improved Pt—WC/C electrocatalysts." Journal of power sources 162.1 (2006): 173-176; 4 pages.
Wu, Mei, et al. "High activity PtPd—WC/C electrocatalyst for hydrogen evolution reaction." Journal of Power Sources 166.2 (2007): 310-316; 7 pages.

* cited by examiner

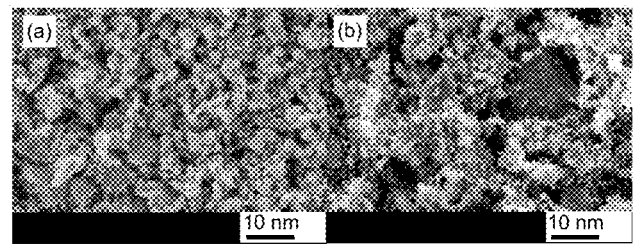
FIGURES 3A-3B
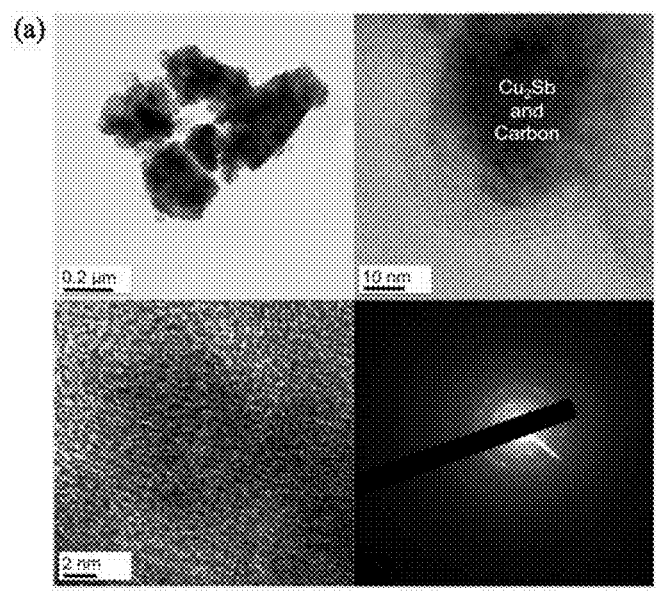
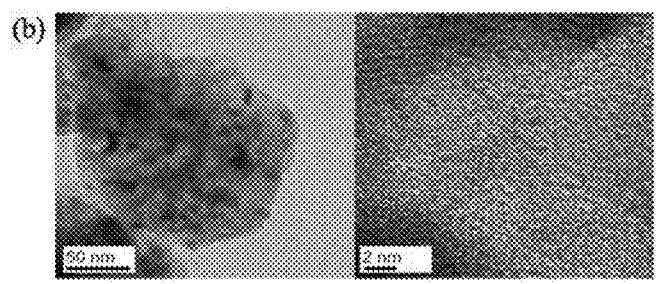
FIGURES 4A-4B

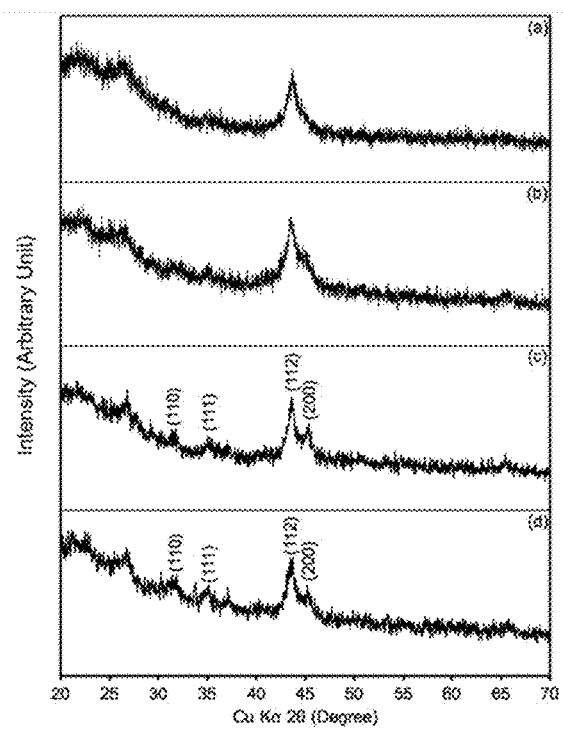
FIGURES 10A-D
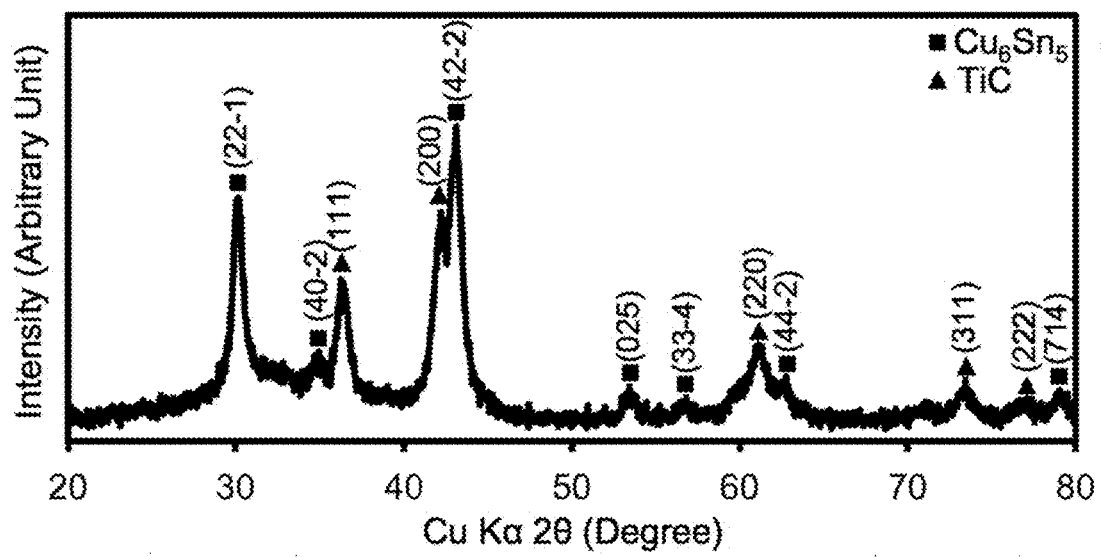
FIGURE 11

ANODE MATERIALS FOR LITHIUM-ION BATTERIES

PRIORITY CLAIM

The present application is a continuation application of International Application No. PCT/US2012/051173 filed Aug. 16, 2012; which claims priority to U.S. Provisional Patent Application No. 61/525,532 filed Aug. 19, 2011, and also claims priority to U.S. Provisional Patent Application No. 61/539,135 filed Sep. 26, 2011, which are incorporated by reference herein in its entirety.

STATEMENT OF GOVERNMENT INTEREST

The present invention was developed using funding from the United States government through Department of Energy Grant No. DE-AC02-05CH11231, and Department of Energy Grant No. DE-SC005397. The United States government has certain rights to the invention.

TECHNICAL FIELD

The current invention relates to materials usable as anodes in batteries, particularly lithium-ion secondary (rechargeable) batteries. The invention also relates to anodes and batteries containing such materials. The invention further relates to methods of making the materials and anodes and batteries using such materials.

BACKGROUND

Basic Principles of Batteries and Electrochemical Cells

Batteries may be divided into two principal types, primary batteries and secondary batteries. Primary batteries may be used once and are then exhausted. Secondary batteries are also often called rechargeable batteries because after use they may be connected to an electricity supply, such as a wall socket, and recharged and used again. In secondary batteries, each charge/discharge process is called a cycle. Secondary batteries eventually reach an end of their usable life, but typically only after many charge/discharge cycles.

Secondary batteries are made up of an electrochemical cell and optionally other materials, such as a casing to protect the cell and wires or other connectors to allow the battery to interface with the outside world. An electrochemical cell includes two electrodes, the positive electrode or cathode and the negative electrode or anode, an insulator separating the electrodes so the battery does not short out, and an electrolyte that chemically connects the electrodes.

In operation the secondary battery exchanges chemical energy and electrical energy. During discharge of the battery, electrons, which have a negative charge, leave the anode and travel through outside electrical conductors, such as wires in a cell phone or computer, to the cathode. In the process of traveling through these outside electrical conductors, the electrons generate an electrical current, which provides electrical energy.

At the same time, in order to keep the electrical charge of the anode and cathode neutral, an ion having a positive charge leaves the anode and enters the electrolyte and a positive ion also leaves the electrolyte and enters the cathode. In order for this ion movement to work, typically the same type of ion leaves the anode as enters the cathode. Additionally, the electrolyte typically also contains this same type of ion. For instance, in a lithium-ion battery, the ion that leaves the anode, enters the cathode, and is found in the electrolyte is a lithium ion ($Li^+$).

In order to recharge the battery, the same process happens in reverse. By supplying energy to the cell, electrons are induced to leave the cathode and move into the anode. At the same time a positive ion, such as $Li^+$, leaves the cathode and enters the electrolyte and a $Li^+$ leaves the electrolyte and enters the anode to keep the overall electrode charge neutral.

In addition to containing an active material that exchanges electrons and ions, anodes and cathodes often contain other materials, such as a metal backing to which a slurry is applied and dried. The slurry often contains the active material as well as a binder to help it adhere to the backing and conductive materials, such as a carbon particles. Once the slurry dries it forms a coating on the metal backing.

Unless additional materials are specified, batteries as described herein include systems that are merely be electrochemical cells as well as more complex systems.

Anodes in Lithium-Ion Batteries

In order for a battery to function properly, the materials used in the anode, cathode and electrolyte are typically selected to have compatible electrical, chemical, and electrochemical properties. For instance, the materials may be selected to operate at compatible voltages. Many rechargeable lithium-ion batteries use carbon, typically in the form of graphite, as the anode because of voltage compatibility. Graphite, however, suffers from a number of drawbacks.

First, graphite anodes cause limits in battery properties. For instance, they limit theoretical gravimetic capacity to 372 mAh/g and theoretical volumetric capacity to 830 Ah/L or practical volumetric capacity to around 350 Ah/L, meaning that a heavier and larger battery is required to supply sufficient energy for many applications. In some instances, this does not cause serious problems but in others, where, for example, it results in a much heavier and less-efficient automobile or a heavier laptop computer, it is a significant drawback.

Second, the surface of the carbon anode is prone to unwanted chemical reactions with the electrolyte. This can lead to the formation of new chemicals, which are deposited on the surface of the carbon anode in a solid-electrolyte interfacial (SEI) layer. The SEI layer can impede lithium-ion access to the anode and interfere with battery function.

Third, because the charge/discharge potential of carbon anodes in many lithium-ion batteries is close to the potential at which $Li^+$ converts from its ionic state back to a metal (Li or $Li^0$), Li metal often forms a deposit on the anode. This deposit, like the SEI layer, can impede lithium-ion access to the anode. More importantly, as the Li metal deposit grows with each charge/discharge cycle, it eventually extends from the anode over to the cathode. Li metal is conductive, so when this occurs electrons can move from the anode to the cathode via the Li metal deposit instead of through the external electrical conductor. When this happens, the battery short circuits and no longer provides power to the device containing the external electrical conductor. As a result, the battery is no longer useful and must be discarded.

Graphite anodes also experience a fourth problem when used with cathodes containing manganese, such as manganese oxide spinels. In such batteries, manganese slowly leaches from the cathode and enters the electrolyte where it eventually makes its way to the anode. Once there, it reacts with the anode in very unfavorable manners that eventually "poison" the anode and destroy its ability to participate in the battery's electrochemical reactions. At this point, the battery is no longer useful and also must be discarded. This problem associated with carbon anodes has long hampered the development of lithium-ion batteries with manganese-based cathodes, many of which are otherwise useful materials.

To address these drawbacks, many alternative anode materials have been explored. For instance, anodes using various metals have been created and tested. Many of these metal-based anodes overcome one or more of the drawbacks associated with carbon anodes, but, unfortunately, metal-based anodes often suffer from different drawbacks that similarly render them non-ideal or otherwise incompatible with useful electrolytes or cathodes. For instance, antimony (Sb)-based anodes exhibit improved gravimetric and volumetric capacity, but tend to fail or exhibit large capacity fade after a relatively low number of cycles. This failure results from physical degradation of the anode because particles of the anode material found in the coating portion of the electrode change volume substantially between their charged and discharged states. As a result, these particles become physically detached from other coating materials, such as conductive particles, and otherwise degrade the coating, resulting in a decrease in anode function and occasionally eventual anode failure.

SUMMARY

Embodiments of the current invention described in this disclosure overcome one or more drawbacks associated with carbon and previous metal anodes or are otherwise suitable anode materials for use in a lithium-ion battery.

In one embodiment, the current invention relates to an anode material with the general formula $M_ySb-M'O_x$—C, where M is selected from the group consisting of copper (Cu), molybdenum (Mo), nickel (Ni), titanium (Ti), or tin (Sn), and combinations thereof, M' is selected from the group consisting of aluminum (Al), magnesium (Mg), titanium (Ti), vanadium (V), chromium (Cr), manganese (Mn), iron (Fe), cobalt (Co), nickel (Ni), zirconium (Zr), molybdenum (Mo), tungsten (W), niobium (Nb), or tantalum (Ta), and combinations thereof, and $M'O_x$—C forms a matrix containing $M_ySb$.

According to another embodiment, the invention relates to an anode material with the general formula $M_ySn-M'C_x$—C, where M is selected from the group consisting of copper (Cu), molybdenum (Mo), nickel (Ni) titanium (Ti), zinc (Zn), or antimony (Sb), and combinations thereof, M' is selected from the group consisting of titanium (Ti), vanadium (V), chromium (Cr), iron (Fe), cobalt (Co), nickel (Ni), molybdenum (Mo), tungsten (W), or silicon (Si), and combinations thereof, and $M'C_x$—C forms a matrix containing $M_ySn$.

According to a third embodiment, the invention relates to an anode material with the general formula $Mo_3Sb_7$—C, where —C forms a matrix containing $Mo_3Sb_7$.

According to a fourth embodiment, the invention relates to an anode material with the general formula $M_ySb-M'C_x$—C, where M may be an electrochemically active metal and M' may be another metal and where $M'C_x$—C forms a matrix containing $M_ySb$.

Other embodiments relate to anodes or rechargeable batteries containing these materials as well as methods of making these materials using ball-milling techniques.

In the general formulas used herein, hyphens "-" indicate chemical compositions that are intermingled to form a composite material. Chemical bonds may or may not be present between these components of a composite material.

The following abbreviations are commonly used throughout the specification:
Li$^+$—lithium ion
Li$^0$—elemental or metallic lithium
$M_ySb$—metal antimonide
$Cu_2Sb$—copper antimonide
MoSb—molybdenum antimonide
$M'O_x$—metal oxide
$Al_2O_3$—aluminum oxide
$Sb_2O_3$—antimony oxide
$M_ySn$—metal stannide
$M'C_x$—metal carbide
TiC—titanium carbide
$Mo_3Sb_7$—molybdenum antimonide
$Cu_2Sb-Al_2O_3$—C—copper antimonide aluminum oxide and carbon composite
CuSn—TiC—C—copper stannide titanium carbide and carbon composite
$Mo_3Sb_7$—C—molybdenum antimonide and carbon composite
MoSb—TiC—C—molybdenum antimonide-titanium carbide-carbon composite
SEI—solid-electrolyte interfacial
HEMM—high-energy mechanical milling
XRD—X-ray diffraction
XPS—X-ray photoelectron spectroscopy
SEM—scanning electron microscopy
TEM—transmission electron microscopy
STEM—scanning transmission electron microscopy
EIS—electrochemical impedance spectroscopy

BRIEF DESCRIPTION OF THE DRAWINGS

A more complete understanding of the present embodiments and advantages thereof may be acquired by referring to the following description taken in conjunction with the accompanying drawings, which relate to embodiments of the present disclosure. The current specification contains color drawings. Copies of these drawings may be obtained from the USPTO.

FIG. 3A provides an SEM image of $Cu_2Sb$—C. FIG. 3B provides an SEM image of $Cu_2Sb-Al_2O_3$—C.

FIG. 4A provides TEM images of $Cu_2Sb-Al_2O_3$—C powder. FIG. 4B provides TEM images of $Cu_2Sb$—C powder.

FIG. 6A provides cycle performance of $Cu_2Sb-Al_2O_3$—C and $Cu_2Sb$—C at 55° C. and a current of 100 mA/g of active electrode material between 0-2 V vs. Li/Li$^+$.

FIG. 10A provides ex-situ XRD data for a $Cu_2Sb$—$Al_2O_3$—C electrode before cycling. FIG. 10B provides ex-situ XRD data for a $Cu_2Sb$—$Al_2O_3$—C electrode after 1 cycle. FIG. 10C provides ex-situ XRD data for a $Cu_2Sb$—$Al_2O_3$—C electrode before cycling after 50 cycles. FIG. 10D provides ex-situ XRD data for a $Cu_2Sb$—$Al_2O_3$—C electrode after 500 cycles.

FIG. 11 provides XRD patterns of a CuSn—TiC—C nanocomposite.

In FIG. 25, the reflections marked with a closed triangle correspond to the $MoO_2$ impurity phase.

FIG. 29D provides the equivalent circuit used for the measurements.

DETAILED DESCRIPTION

Figure 1:
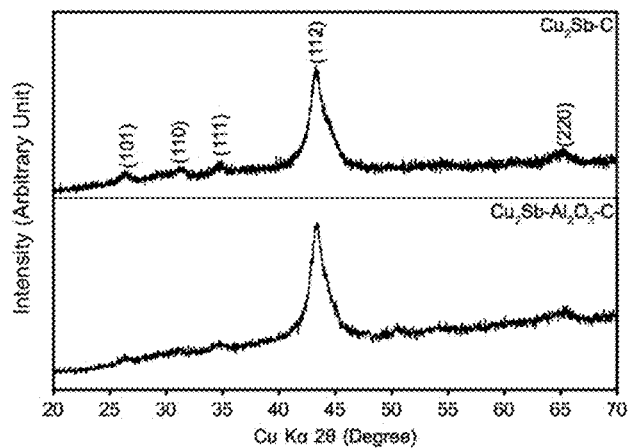
FIG. 1 provides XRD patterns of $Cu_2Sb$—C and $Cu_2Sb-Al_2O_3$—C nano composites.

The current disclosure relates to four general types of anode materials, anodes and batteries containing such materials, and methods of making these materials. Although the anode materials are typically described herein in their delithiated forms, when used in a rechargeable lithium-ion battery, they will additionally contain lithium ions ($Li^+$) in amounts that will vary as the battery cycles through its charged and discharged states. The number of $Li^+$ that may be in any general chemical formula will depend on the number of elections gained by the anode material when that battery is in a fully charged state as compared to a fully discharged state.

$M_y$Sb-$M'O_x$—C Materials

The first type of anode material has the general formula $M_y$Sb-$M'O_x$—C, where M may be a metal such as copper (Cu), molybdenum (Mo), nickel (Ni), titanium (Ti), or tin (Sn), or combination thereof, or similar metals and combinations thereof, and where M' may be aluminum (Al), magnesium (Mg), titanium (Ti), vanadium (V), chromium (Cr), manganese (Mn), iron (Fe), cobalt (Co), nickel (Ni), zirconium (Zr), molybdenum (Mo), tungsten (W), niobium (Nb), or tantalum (Ta), or combinations thereof, or similar metals and combinations thereof. In one specific embodiment, the first type of anode material may have the general formula $Cu_2$Sb—$Al_2O_3$—C.

In specific embodiments, the material may be present in the form of a nanocomposite material in which crystalline particles of $Cu_2$Sb are embedded in a matrix of the other materials. $Cu_2$Sb particles may have an average diameter or size of 500 nm or less, 200 nm or less, 100 nm or less, or 50 nm or less. In particular, they may have an average diameter of between 1 and 20 nm.

In an anode material with the general formula $M_y$Sb-$M'O_x$—C, $M_y$Sb particles provide electrochemical activity. These particles may be nanostructured. In the $Cu_2$Sb portion of the $Cu_2$Sb—$Al_2O_3$—C embodiment, a conductive Cu framework supports the electrochemically active Sb. In other embodiments, $M_y$ may provide a similar conductive framework. $M'O_x$, which may also be referred to as a ceramic oxide, may be amorphous or partially amorphous. The —C portion forms a conductive carbon matrix with the $M'O_x$. $M_y$Sb is dispersed within this matrix.

In one embodiment, the particulate nature of the $M_y$Sb portion of the $M_y$Sb-$M'O_x$—C anode material may not develop until after the material has been cycled in an electrochemical cell. In some embodiments, the particulate nature may not be present until the material has been cycled at least 50 or at least 100 times in an electrochemical cell. Prior to that time, regions of crystallinity, but not well-defined particles may be observed.

Materials of the general formula $M_y$Sb-$M'O_x$—C may reduce or minimize the effects of changes in volume as lithium ions enter and leave the material by blending nanostructured materials that are electrochemically active towards lithium ($M_y$Sb) with materials that are inactive towards lithium ($M'O_x$ and —C) to form composite anode materials. Although, in some embodiments, the nanostructured materials may offer shorter diffusion lengths for lithium ions and may accommodate the strain due to volume changes during battery cycling, the large surface-area-to-volume ratio resulting from the particles' small size and the high surface reactivity of these nanostructured materials may be problematic. The addition of $M'O_x$—C to form an inactive matrix may help buffer the volume change in the electrochemically active material during charge/discharge cycles. The $M'O_x$—C matrix may also reduce agglomeration of the $M_y$Sb particles, which is detrimental to battery performance.

Anode materials with the general formula $M_y$Sb-$M'O_x$—C typically operate at potentials sufficiently higher than the potential at which $Li^+$ converts to $Li^0$ to avoid plating of lithium metal on the anode, or to reduce the rate of plating to a rate sufficiently low to avoid failure of the battery due to a short circuit during its expected lifetime. The operational potential may also prevent or reduce formation of an SEI layer.

Anode materials of general formula $M_y$Sb-$M'O_x$—C may be used in a battery with an expected lifetime of thousands of cycles, for example at least 1000 cycles, or at least 2000 cycles.

These anodes may exhibit a much higher gravimetric and volumetric capacities than a graphite anode. For instance, they may have a gravimetric capacity of between 380 and 650 mAh/g and a volumetric capacity of between 450 and 1,000 Ah/L.

Such batteries may retain at least 70% of their gravimetric or volumetric capacity after a large number of cycles such a thousand or more cycles.

Anode materials with the general formula $M_y$Sb-$M'O_x$—C may have a high tap density of greater than 1 g/cm$^3$.

Finally, anode materials with the general formula $M_y$Sb-$M'O_x$—C may be resistant to poisoning by Mn contained in the cathode.

Anode materials with the general formula $Cu_2$Sb—$Al_2O_3$—C may be synthesized, in some embodiments, by mechanochemical reduction of $Sb_2O_3$ with Al and Cu metals in the presence of carbon. The carbon may be from an elemental or polymeric carbon source. For instance, it may be in the form of acetylene black or another similar material. In a specific embodiment, the mechanochemical reduction may be carried out in a single, one-step, high-energy mechanical milling (HEMM) process, which is a type of ball-milling process. Similar methods may be used for other materials of the general formula $M_y$Sb-$M'O_x$—C.

$M_y$Sn-$M'C_x$—C Materials

The second type of anode material has the general formula $M_y$Sn-$M'C_x$—C, where M may be a metal such as copper (Cu), molybdenum (Mo), nickel (Ni), titanium (Ti), zinc (Zn), or antimony (Sb), combinations thereof, or similar metals and combinations thereof, and where M' may be titanium (Ti), vanadium (V), chromium (Cr), iron (Fe), cobalt (Co), nickel (Ni), molybdenum (Mo), tungsten (W), or silicon (Si) or combinations thereof, or similar metals and combinations thereof. In one specific embodiment, the second type of anode material may have the general formula CuSn—TiC—C.

In specific embodiments, the material may be present in the form of a nanocomposite material. In particular, it may contain particles of CuSn with an average diameter or size of 500 nm or less, 200 nm or less, 100 nm or less, or 50 nm or less.

In an anode material with the general formula $M_y$Sn-$M'C_x$—C, $M_y$Sn particles provide electrochemical activity. These particles may be nanostructured. In the CuSn portion of the CuSn—TiC—C embodiment, a conductive Cu framework supports the electrochemically active Sn. In other embodiments, $M_y$ may provide a similar conductive framework. $M'C_x$ may be amorphous or partially amorphous. The —C portion forms a conductive carbon matrix with the $M'C_x$. $M_y$Sn is dispersed within this matrix.

Materials of the general formula $M_y$Sb-M'O$_x$—C may reduce or minimize the effects of changes in volume as lithium ions enter and leave the material by blending nanostructured materials that are electrochemically active towards lithium ($M_y$Sn) with materials that are inactive towards lithium (M'C$_x$ and —C) to form composite anode materials. Although, in some embodiments, the nanostructured materials may offer shorter diffusion lengths for lithium ions and may accommodate the strain due to volume changes during battery cycling, the large surface-area-to-volume ratio resulting from the particles' small size and the high surface reactivity of these nanostructured materials may be problematic. The addition of M'C$_x$—C to form an inactive matrix may help buffer the volume change in the electrochemically active material during charge/discharge cycles. The M'C$_x$—C matrix may also reduce agglomeration of the $M_y$Sb particles, which is detrimental to battery performance.

Anode materials with the general formula $M_y$Sn-M'C$_x$—C typically operate at potentials that are sufficiently higher than the potential at which Li$^+$ converts to Li$^0$ to avoid plating of lithium metal on the anode, or to reduce the rate of plating to a rate sufficiently low to avoid failure of the battery due to a short circuit during its expected lifetime. The operational potential may also prevent or reduce formation of an SEI layer.

Anode materials of general formula $M_y$Sn-M'C$_x$—C may be used in a battery with an expected lifetime of thousands of cycles, for example at least 1000 cycles, or at least 2000 cycles.

These anodes may exhibit volumetric capacity of at least 4 times higher than that of a graphite anode. For example, such anodes may exhibit a second cycle discharge capacity of >1,000 mAh/cm$^3$.

Such batteries may retain at least 70% of their gravimetric or volumetric capacity after a large number of cycles such as thousands of cycles.

Anode materials with the general formula $M_y$Sn-M'C$_x$—C may have a tap density of at least 2.0 g/cm$^3$.

Finally, anode materials with the general formula $M_y$Sn-M'C$_x$—C may be resistant to poisoning by Mn contained in the cathode.

Anode materials with the formula CuSn—TiC—C may be synthesized, in some embodiments, by first furnace heating a mixture of Sn and other metals and then ballmilling the resulting compounds in the presence of carbon to achieve a mechanochemical reduction. The carbon may be from an elemental or polymeric carbon source. For instance, it may be in the form of acetylene black or another similar material. In a specific embodiment, the material is formed by first furnace heating a mixture of Sn, Cu, and Ti, and then ballmilling the resulting compounds in the presence of carbon to achieve a mechanochemical reduction. Similar methods may be used for other materials of the general formula $M_y$Sn-M'C$_x$—C.

Mo$_3$Sb$_7$—C Materials

The third type of anode material has the general formula of Mo$_3$Sb$_7$—C. The material may be a composite including Mo$_3$Sb$_7$ uniformly dispersed in a conductive carbon matrix. The Mo$_3$Sb$_7$ may be in the form of highly crystalline particles in the size range 500 nm or less, particularly of 100 nm to 1 µm.

Particles of Mo$_3$Sb$_7$ in Mo$_3$Sb$_7$—C may constrain Sb via its crystal structure, thereby preventing agglomeration of the Sb, which is responsible for capacity fade in most Sb alloy electrodes. Mo$_3$Sb$_7$ also experiences significant changes in volume during cycling.

The inclusion of the material in a carbon matrix reduces the effects of these volume changes. Mo$_3$Sb$_7$—C materials may have a discharge capacity of at least 500 mAh/g or at least 900 mAh/cm$^3$. These materials may exhibit a tap density of at least 1.5 g/cm$^3$. Mo$_3$Sb$_7$—C anodes may operate at a voltage of above 0.5 V, which is sufficiently higher than the potential at which Li$^+$ converts to Li$^0$ to avoid plating of lithium metal on the anode, or to reduce the rate of plating to a rate sufficiently low to avoid failure of the battery due to a short circuit during its expected lifetime.

In one alternative embodiment, the material may further include an oxide, such as Al$_2$O$_3$, TiO$_2$, VO$_2$, MoO$_2$, or WO$_2$, to form a composite material.

Mo$_3$Sb$_7$—C composite material may be formed by first firing a mixture of Mo and Sb metals in a furnace to obtain Mo$_3$Sb$_7$. This material may then be placed in an HEMM process with carbon to form Mo$_3$Sb$_7$—C. The carbon may be from an elemental or polymeric carbon source. For instance, it may be in the form of acetylene black or another similar material.

$M_y$Sb-M'C$_x$—C Materials

The fourth type of anode material has the general formula $M_y$Sb-M'C$_x$—C, where M may be an electrochemically active metal and M' may be another metal. In one specific embodiment, the first type of anode material may have the general formula MoSb—TiC—C. In specific embodiments, the material may be present in the form of a nanocomposite material containing MSb in a matrix of M'C$_x$ and —C. In particular, it may contain particles of MSb with an average diameter or size of 500 nm or less, 200 nm or less, 100 nm or less, or 50 nm or less.

In an anode material with the general formula $M_y$Sb-M'C$_x$—C, $M_y$Sb particles provide electrochemical activity. These particles may be nanostructured. The —C portion forms a conductive carbon matrix with the M'C$_x$. $M_y$Sb is dispersed within this matrix.

Materials of the general formula $M_y$Sb-M'C$_x$—C may reduce or minimize the effects of changes in volume as lithium ions enter and leave the material by blending nanostructured materials that are electrochemically active towards lithium ($M_y$Sb) with materials that are inactive towards lithium (M'C$_x$ and —C) to form composite anode materials. Although, in some embodiments, the nanostructured materials may offer shorter diffusion lengths for lithium ions and may accommodate the strain due to volume changes during battery cycling, the large surface-area-to-volume ratio resulting from the particles' small size and the high surface reactivity of these nanostructured materials may be problematic. The addition of M'C$_x$—C to form an inactive matrix may help buffer the volume change in the electrochemically active material during charge/discharge cycles. The M'O$_x$—C matrix may also reduce agglomeration of the $M_y$Sb particles, which is detrimental to battery performance.

Anode materials with the general formula $M_y$Sb-M'C$_x$—C may be synthesized, in some embodiments, by a high-energy mechanical milling (HEMM) process. Anode materials with the formula $M_y$Sb-M'C$_x$—C may be synthesized, in some embodiments, by first furnace heating a mixture of Sb and other metals and then ballmilling the resulting compounds in the presence of carbon to achieve a mechanochemical reduction. The carbon may be from an elemental or polymeric carbon source. For instance, it may be in the form of acetylene black or another similar material.

Anodes and Batteries

The invention also includes anodes made from any of the anode materials described above. Such anodes may include a metal or other conductive backing and a coating containing the anode material. The coating may be formed by applying a slurry to the metal backing. The slurry and resulting coating may contain particles of the anode material. Although in many embodiments agglomerates may not be preferred, in other embodiments the coating may include agglomerates of particles of the anode material. The anode may contain only one type of anode material, or it may contain multiple types of anode materials, including additional anode materials different from those described above. The coating may further include conductive agents, such as carbon. Furthermore, the coating may contain binders, such as polymeric binders, to facilitate adherence of the coating to the metal backing or to facilitate formation of the coating upon drying of the slurry. In some embodiments the anode may be in the form of metal foil with a coating.

In another embodiment, the invention relates to a battery containing an anode including an anode material as described above. The anode may of a type described above. The battery may further contain a cathode and an electrolyte to complete the basic components of an electrochemical cell. The cathode and electrolyte may be of any sort able to form a functional rechargeable battery with the selected anode material. The battery may further contain contacts, a casing, or wiring. In the case of more sophisticated batteries it may contain more complex components, such as safety devices to prevent hazards if the battery overheats, ruptures, or short circuits. Particularly complex batteries may also contain electronics, storage media, processors, software encoded on computer readable media, and other complex regulatory components.

Batteries may be in very traditional forms, such as a coin cells or jelly rolls, or in more complex forms such as prismatic cells. Batteries may contain more than one electrochemical cell and may contain components to connect or regulate these multiple electrochemical cells.

Batteries of the present invention may be used in a variety of applications. They may be in the form of standard battery size formats usable by a consumer interchangeably in a variety of devices. They may be in power packs, for instance for tools and appliances. They may be usable in consumer electronics including cameras, cell phones, gaming devices, or laptop computers. They may also be usable in much larger devices, such as electric automobiles, motorcycles, buses, delivery trucks, trains, or boats. Furthermore, batteries according to the present invention may have industrial uses, such as energy storage in connection with energy production, for instance in a smart grid, or in energy storage for factories or health care facilities, for example in the place of generators.

EXAMPLES

The following examples are provided to further illustrate specific embodiments of the invention. They are not intended to disclose or describe each and every aspect of the invention in complete detail and should be not be so interpreted.

Example 1

Formation of $Cu_2Sb$—$Al_2O_3$—C Nanocomposite Material and Electrodes and Coin Cells Containing this Material $Cu_2Sb$—$Al_2O_3$—C nanocomposite and $Cu_2Sb$—C nanocomposite materials as well as electrodes and coin cells using these materials in Examples 2-7 herein were prepared as described in this Example 1.

A $Cu_2Sb$—$Al_2O_3$—C nanocomposite, according to an embodiment of the present invention was synthesized by a reduction of $Sb_2O_3$ (99.6% (purity), Alfa Chem, Kings Point, N.Y.) with aluminum (99.97%, 17 μm (particle size), Alfa. Chem.) and formation of $Cu_2Sb$ with copper (99%, 45 μm, Acros Organics, Geel, Belgium) metal powder in the presence of carbon (acetylene black) by a high-energy mechanical milling (HEMM) process, as illustrated below by reaction 1:

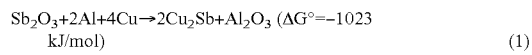

$$Sb_2O_3 + 2Al + 4Cu \rightarrow 2Cu_2Sb + Al_2O_3 \ (\Delta G° = -1023 \text{ kJ/mol}) \quad (1)$$

The overall negative free-energy change makes the reduction reaction (1) spontaneous. The required quantities of $Sb_2O_3$, Al, and Cu were mixed with acetylene black in an $Sb_2O_3$—Al—Cu:C weight ratio of 80:20. Control $Cu_2Sb$—C nanocomposite material without $Al_2O_3$ was obtained through a two-step process: (i) stoichiometric amounts of Cu and Sb were ball-milled to form $Cu_2Sb$, and (ii) the resultant $Cu_2Sb$ powder was ball-milled with 20 wt, % acetylene black to form the $Cu_2Sb$—C nanocomposite. All HEMM steps were carried out in a planetary ball mill (Fritsch Pulverisette 6 planetary mill) for 12 hours (h) at a speed of 500 rpm at ambient temperature under argon atmosphere in hardened steel vials having an 80 cm³ capacity with steel balls (diameter: ½ and ¼ in.) in a ball:powder weight ratio of 20:1. The vials were sealed inside an argon-filled glovebox prior to milling.

Electrodes containing $Cu_2Sb$—$Al_2O_3$—C nanocomposite material for use in electrochemical tests were prepared by coating a copper foil with a slurry that was composed of 70 wt. % $Cu_2Sb$—$Al_2O_3$—C powder as the active material, 15 wt. % carbon black (Super P) as a conductive agent, 15 wt. % poly(vinylidene fluoride) (PVDF) as a binder, and N-methylpyrrolidinone (NMP) as the solvent. Following the coating step, the copper foil was dried at 120° C. for 2 h under vacuum. CR2032 coin cells were assembled in an argon-filled glovebox with the electrodes thus prepared, using Celgard polypropylene as a separator, lithium foil as the counter electrode, and 1 M $LiPF_6$ in ethylene carbonate (EC)/diethyl carbonate (DEC) (1:1 v/v) as the electrolyte.

Example 2

X-Ray Diffraction Analysis of $Cu_2Sb$—$Al_2O_3$—C Nanocomposite Material

The phase analysis of the synthesized samples was performed with a Phillips X-ray diffraction (XRD) system with Cu Kα radiation. XRD patterns of the $Cu_2Sb$—$Al_2O_3$—C and $Cu_2Sb$—C nanocomposites are given in FIG. 1. Both nanocomposites show broad reflections corresponding to $Cu_2Sb$ (JCDPS Powder Diffraction File Card No. 22-601). No reflections corresponding to $Al_2O_3$ were observed in the case of $Cu_2Sb$—$Al_2O_3$—C, possibly due to an amorphous or poorly crystalline character of $Al_2O_3$.

In order to investigate any structural changes that occurred during electrochemical cycling, XRD data were collected from electrodes that had been detached from cycled cells and covered with polyimide tape as a protective film. XRD was performed on electrodes that had been cycled to different points in the charge/discharge cycle. The XRD patterns of cycled $Cu_2Sb$—$Al_2O_3$—C electrodes after 1, 50, and 500 cycles support the notion that the degree of crystallinity of $Cu_2Sb$—$Al_2O_3$—C increases with the number of cycles (FIG. 10).

Example 3

SEM and TEM Analysis of $Cu_2Sb$—$Al_2O_3$—C Nanocomposite Material

The morphology, microstructure, and composition of the synthesized powders were examined with a JEOL JSM-5610 scanning electron microscope (SEM) system and a JEOL 2010F transmission electron microscopy (TEM) system.

The morphology and particle size of $Cu_2Sb$—$Al_2O_3$—C and $Cu_2Sb$—C were investigated with SEM and TEM. SEM images of $Cu_2Sb$—$Al_2O_3$—C and $Cu_2Sb$—C in FIGS. 3A and 3B show the sub-micron particle size distribution of the composite material. The overall particle sizes of the $Cu_2Sb$—$Al_2O_3$—C and the $Cu_2Sb$—C materials are similar. The TEM images of $Cu_2Sb$—$Al_2O_3$—C (FIG. 4A) show that the material is composed of 2-10 nm sized, crystalline $Cu_2Sb$ particles mixed with carbon. The $Al_2O_3$ in the $Cu_2Sb$—$Al_2O_3$—C material could not be observed with TEM. When compared to the $Cu_2Sb$—$Al_2O_3$—C nanocomposite, the TEM of the $Cu_2Sb$—C material shows crystalline regions that are well defined (FIG. 4B).

TEM was also used to observe changes in crystallinity and morphology of cycled electrodes. In order to understand the role of $Al_2O_3$ in providing a significant improvement in the cycle performance of $Cu_2Sb$—C, high-resolution TEM was performed on $Cu_2Sb$—$Al_2O_3$—C and $Cu_2Sb$—C electrodes that had been cycled for different numbers of cycles. $Cu_2Sb$—C was observed after 1, 50, and 247 cycles. 247 cycles was chosen as the stopping point for the $Cu_2Sb$—C cell because $Cu_2Sb$—C already lost over 50% of its stable capacity after 247 cycles. $Cu_2Sb$—$Al_2O_3$—C was observed after 1, 50, and 500 cycles. At 500 cycles, the $Cu_2Sb$—$Al_2O_3$—C cell was still offering stable cycle performance and 99% coulombic efficiency.

Figures 9A, 9B:
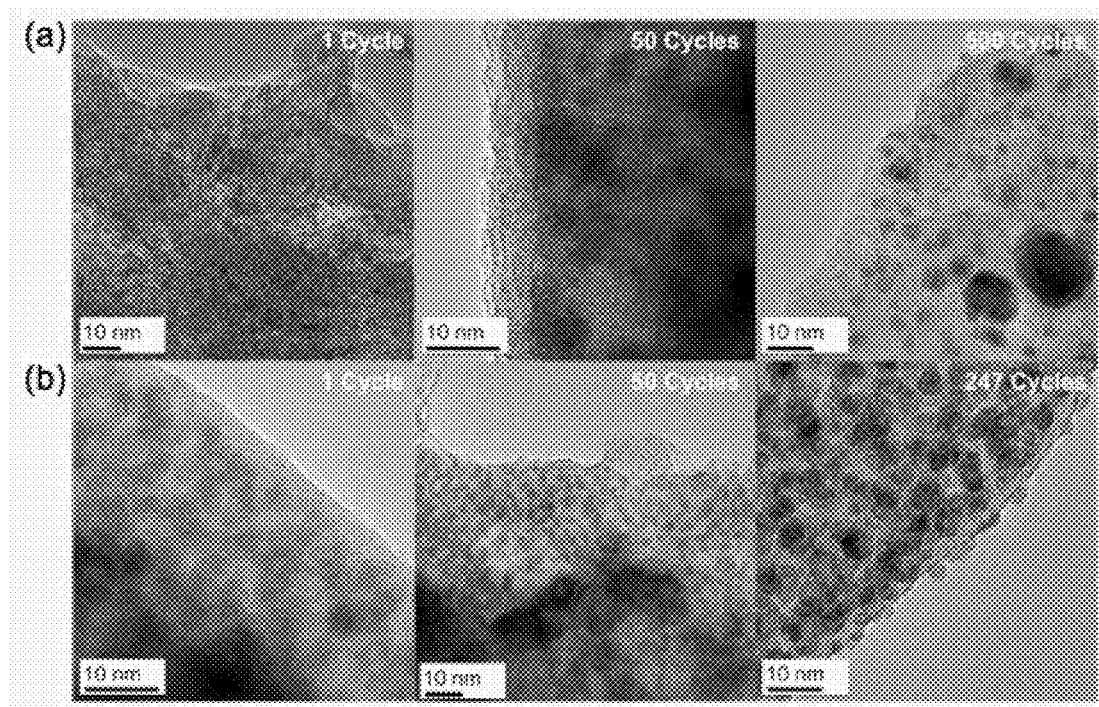
FIG. 9A provides TEM images of $Cu_2Sb$—$Al_2O_3$—C electrode material after 1, 50 and 500 cycles.
FIG. 9B provides TEM images of $Cu_2Sb$—Celectrode material after 1, 50 and 247 cycles.

The images in FIG. 9A show that after one cycle, the $Cu_2Sb$—$Al_2O_3$—C material is largely amorphous. There are some small regions of crystallinity, but the particle boundaries are not well defined. After one cycle, the $Cu_2Sb$—C electrode shows well-defined boundaries of crystalline spherical particles (FIG. 9B). After 50 cycles, $Cu_2Sb$—$Al_2O_3$—C has developed areas of crystallinity. After 50 cycles, $Cu_2Sb$—C has almost completely transformed into crystalline spherical particles that are embedded in a carbon matrix. After 500 cycles, $Cu_2Sb$—$Al_2O_3$—C has retained 94% of the capacity that was observed after 50 cycles and has transformed into well-defined, 2-10 nm crystalline particles that are almost entirely separate from one another and are surrounded by a matrix of $Al_2O_3$ and carbon. After 247 cycles, the $Cu_2Sb$—C material has already lost over 50% of the capacity that was observed at cycle 50. The size of the $Cu_2Sb$—C particles does not significantly change between cycles 50 and 247, but the $Cu_2Sb$—C particles appear to be tightly agglomerated after 247 cycles.

In summary, the presence of $Al_2O_3$ did not significantly change the particle size or outer morphology of $Cu_2Sb$—C particles. However prior to cycling, based on XRD and microscopy data, the $Cu_2Sb$ particles in $Cu_2Sb$—C particles were found to be more crystalline than that in $Cu_2Sb$—$Al_2O_3$—C. The presence of $Al_2O_3$ does not, however, significantly influence the particle size or morphology. The $Al_2O_3$ matrix allows the $Cu_2Sb$ particles to remain separate yet electronically connected within the nanocomposite during cycling, thus reducing agglomeration and providing the exceptional cycle life and lower impedance than is observed with $Cu_2Sb$—C.

Example 4

APS Analysis of $Cu_2Sb$—$Al_2O_3$—C Nanocomposite Material

Surface characterization was performed on an uncycled $Cu_2Sb$—$Al_2O_3$—C electrode with a Kratos X-ray photoelectron spectrometer (XPS) with a monochromatic Al Kα source. The uncycled $Cu_2Sb$—$Al_2O_3$—C electrode was extracted from a coin cell in an argon-filled glovebox and transferred into the XPS chamber via an argon-filled capsule. The surface of the electrode was cleaned of surface oxides and electrolyte salts by sputtering with a 4 keV beam energy and an extractor current of 75 to for 5.5 minutes.

Figure 2:
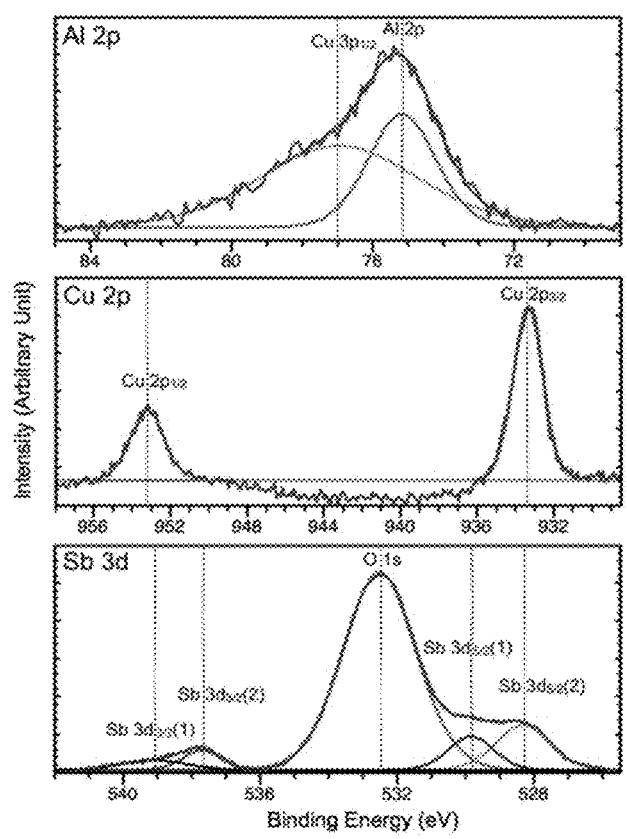
FIG. 2 provides Al 2p, Cu 2p, and Sb 3d XPS data of an uncycled $Cu_2Sb-Al_2O_3$—C electrode.

The $Cu_2Sb$—$Al_2O_3$—C sample prepared in Example 1 was subjected to XPS analysis and the results are shown in FIG. 2. There are two peaks in the Al 2p region. The peak at 75.2 eV corresponds to Al 2p in $Al_2O_3$ while the other peak at 77 eV corresponds to Cu $3p_{1/2}$. The Cu $2p_{3/2}$ peak in the $Cu_2Sb$—$Al_2O_3$—C sample occurs at 933.5 eV compared to 932.7 eV expected for metallic copper. This shift in the Cu $2p_{3/2}$ binding energy indicates the absence of free metallic Cu and the presence of Cu to Sb bonding. The Sb 3d spectrum overlaps with the O 1s spectrum from $Al_2O_3$. There are two pairs of peaks present for Sb 3d. The binding energies of the Sb(2) peaks match closely with that of metallic Sb, suggesting the presence of an amount of metallic Sb impurity although the XRD data did not indicate metallic Sb. The Sb(1) peaks are at higher binding energies than the Sb(2) peaks and are attributed to the antimony that is bound to Cu in the $Cu_2Sb$ alloy.

Example 5

Charge/Discharge, Tap Density, and Electrochemical Cycle Analysis of Electrodes Containing $Cu_2Sb$—$Al_2O_3$—C Nanocomposite Material Charge/discharge experiments were performed galvanostatically at a constant current density of 100 mA/g of active electrode material within a desired voltage range. Tap density measurements were made with a Quantachrome AT-4 Autotap machine. Electrochemical cycle testing at 25° C. was also performed with full, coffee-bag type cells with 4 V manganese spinet material as the cathode and lithium metal as the reference electrode.

Figures 5A, 5B:
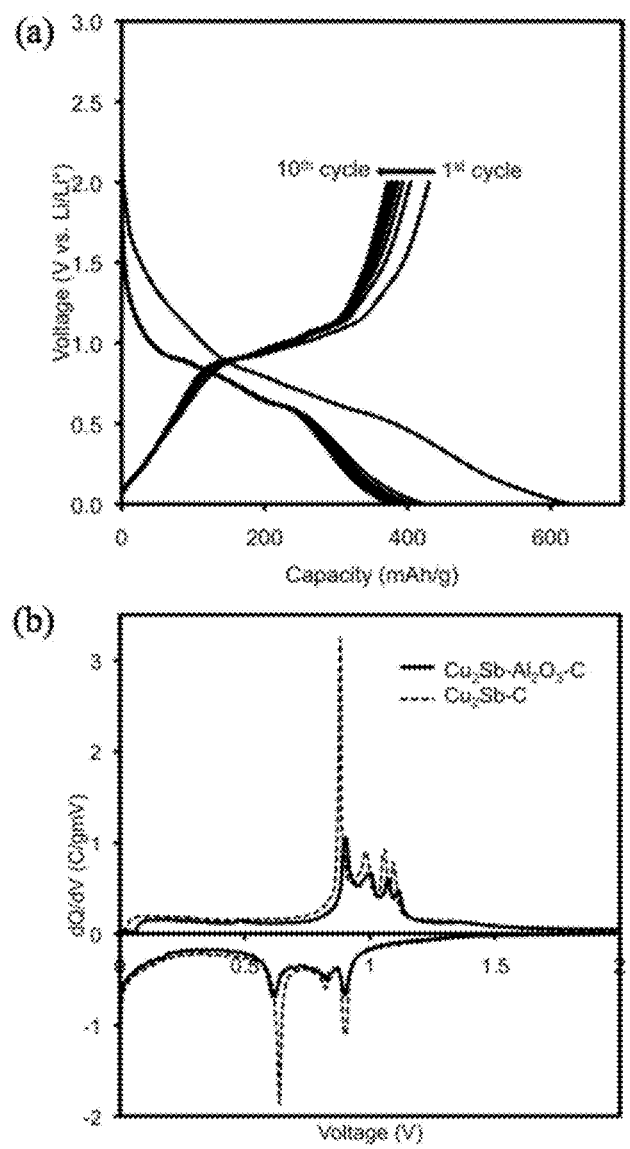
FIG. 5A provides a voltage profile of $Cu_2Sb-Al_2O_3$—C.
FIG. 5B provides a differential capacity plot comparison of $Cu_2Sb-Al_2O_3$—C and $Cu_2Sb$—C at a current rate of 100 mA/g of active electrode material.

The voltage profile and differential capacity plots (DCP) for the $Cu_2Sb$—$Al_2O_3$—C nanocomposite are shown in FIG. 5. The $Cu_2Sb$—$Al_2O_3$—C nanocomposite exhibits first cycle discharge and charge capacities of 633 and 434 mAh/g, respectively, implying an irreversible capacity loss of 199 mAh/g and a coulombic efficiency of 68% in the first cycle. A feature of the DCP, shown in FIG. 5B, is that there are three peaks on the discharge portion of the plot and four peaks in the charge portion of the plot. This suggests that there may be an irreversible reaction that takes place during the charging of the $Cu_2Sb$—$Al_2O_3$—C electrode. It is also possible that the reaction mechanism during discharging is different from the reaction mechanism during charging.

Figures 6A, 6B, 6C, 6D:
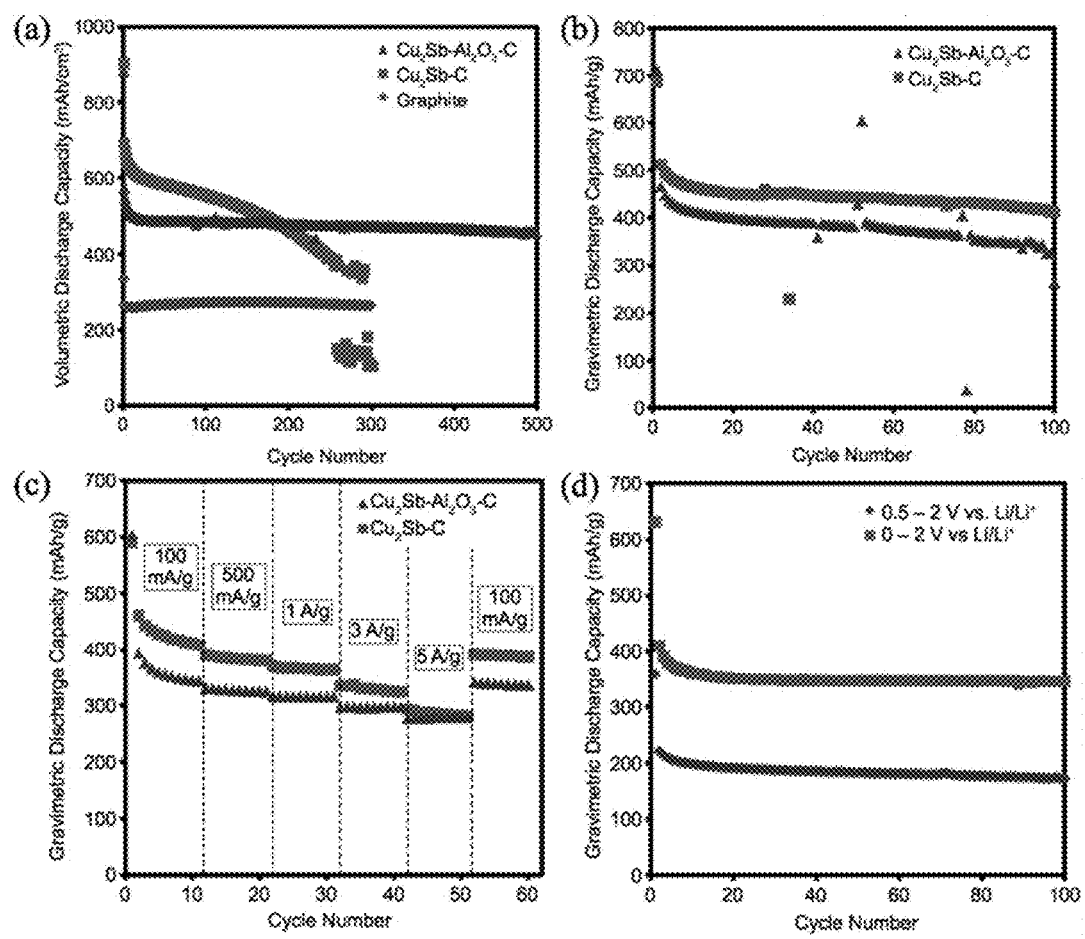
FIG. 6A provides cycle performance of $Cu_2Sb-Al_2O_3$—C from 0-2.0 V vs. Li/Li$^+$ at 25° C. and a current rate of 100 mA/g of active electrode material.
FIG. 6C provides rate capability comparison of $Cu_2Sb-Al_2O_3$—C and $Cu_2Sb$—C at 25° C. between 0-2 V vs. Li/Li$^+$.
FIG. 6D provides a comparison of $Cu_2Sb-Al_2O_3$—C discharged to 0 V and 0.5 V vs. Li/Li$^+$ at 25° C. and a current rate of 100 mA/g of active electrode material. All current rates in FIGS. 6A-6D were calculated per gram of active electrode material.

One of the significant features of $Cu_2Sb$—$Al_2O_3$—C anode material lies in the cycle life. FIG. 6(a) shows the cyclability of $Cu_2Sb$—$Al_2O_3$—C over 500 cycles. $Cu_2Sb$—$Al_2O_3$—C cycles well for 500 cycles at 99% coulombic efficiency. The presence of $Al_2O_3$ in the nanocomposite has a significant impact on the cycle performance of $Cu_2Sb$—$Al_2O_3$—C as compared with that of $Cu_2Sb$—C. As seen in FIG. 6A, $Cu_2Sb$—C alloy anodes are only stable for approximately 100 cycles. The dramatic improvement in volumetric capacity of $Cu_2Sb$—$Al_2O_3$—C over graphite is shown in FIG. 6A. The high-temperature performance of $Cu_2Sb$—C was slightly better than that of $Cu_2Sb$—$Al_2O_3$—C. Both $Cu_2Sb$-based materials were stable for 100 cycles at high temperature (FIG. 6B). When cycled at different charge rates, $Cu_2Sb$—C performs comparably to $Cu_2Sb$—$Al_2O_3$—C, but yields a higher discharge capacity. A higher initial discharge capacity was observed for $Cu_2Sb$—C cells during all other cycle tests as well. Both $Cu_2Sb$—C and $Cu_2Sb$—$Al_2O_3$—C materials showed excellent rate capability. The cycle performance of $Cu_2Sb$—$Al_2O_3$—C and $Cu_2Sb$—C at different charge rates is shown in FIG. 6C.

In summary, the $Cu_2Sb$—C alloy anode was found to show stable cycle performance only to ~100 cycles. Through the incorporation of $Al_2O_3$ in to the alloy anode to form $Cu_2Sb$—$Al_2O_3$—C, the stable cycle performance was extended from 100 cycles to 500. After one cycle and after 20 cycles, the $Cu_2Sb$—$Al_2O_3$—C material showed lower surface, charge-transfer, and bulk resistances than those of $Cu_2Sb$—C.

Example 6

EIS Analysis of Electrodes Containing $Cu_2Sb$—$Al_2O_3$—C Nanocomposite Material Electrochemical impedance spectroscopic analysis (EIS) was conducted with Solartron SI1260 equipment. A signal of 10 MV in amplitude was applied in the frequency range of 10 kHz to 0.001 Hz. In the EIS measurements, the $Cu_2Sb$—$Al_2O_3$—C nanocomposite served as the working electrode, and lithium foil served as the counter and reference electrodes. The impedance response was measured after different numbers of charge-discharge cycles (after 0, 1, and 20 cycles) at 2 V vs. $Li/Li^+$.

EIS measurements of $Cu_2Sb$—$Al_2O_3$—C and $Cu_2Sb$—C (both prepared as described in Example 1) after 0, 1, and 20 cycles were performed in order to further understand the electrochemical performance, and the results are presented in FIG. 8. The EIS data were analyzed based on the equivalent circuit and variables shown in FIG. 8. $R_u$ refers to uncompensated resistance between the working electrode and the lithium reference electrode, $CPE_s$ refers to the constant phase element of the surface layer, $R_s$ refers to the resistance of the SEI layer, $CPE_{dl}$ refers to the CPE of the double layer, $R_{ct}$ refers to the charge-transfer resistance, and $Z_w$ refers to the Warburg impedance. Generally, the EIS spectrum can be divided into three frequency regions: low frequency, medium-to-low frequency, and high frequency, which correspond to cell geometric capacitance, charge transfer reaction, and lithium-ion diffusion through the surface layer, respectively. The slope of the impedance curve in the low frequency region is related to lithium-ion diffusion in the bulk of the active material.

Figures 8A, 8B, 8C, 8D:
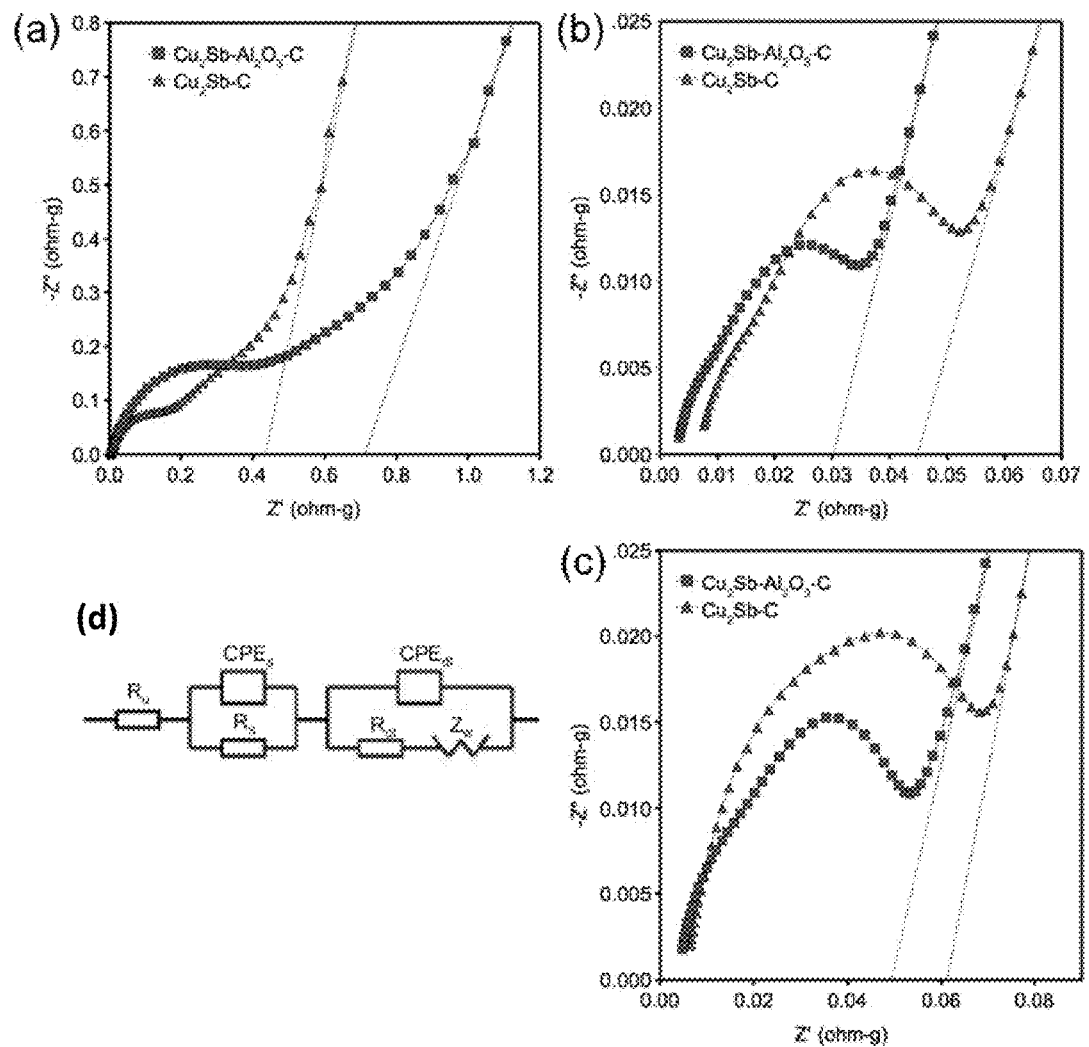
FIG. 8A provides EIS data for $Cu_2Sb$—$Al_2O_3$—C and $Cu_2Sb$—C nanocomposite materials before cycling.
FIG. 8B provides EIS data for $Cu_2Sb$—$Al_2O_3$—C and $Cu_2Sb$—C nanocomposite materials after the 1st cycle.
FIG. 8C provides EIS data for $Cu_2Sb$—$Al_2O_3$—C and $Cu_2Sb$—C nanocomposite materials after the 20th cycle.
FIG. 8D shows the circuit used to obtain the data in FIGS. 8A-C.

Prior to cycling, $Cu_2Sb$—C has lower impedance than $Cu_2Sb$—$Al_2O_3$—C in all three ranges of frequency (FIG. 8A). This behavior is expected due to the fact that a larger weight percent of the $Cu_2Sb$—C electrode material is made up of a copper-containing species and the $Al_2O_3$ in the $Cu_2Sb$—$Al_2O_3$—C material is electronically insulating. Before either material is cycled, the curved portion of the impedance measurement is dominated by the charge-transfer resistance $R_{ct}$, which is related to the electrochemical reaction between the particles or the reaction between the electrode and the electrolyte. After one cycle (FIG. 8B), the shape of the impedance curves for both materials changes. A semicircle is observed for each of the high and medium-to-low frequency ranges. The overall impedance of both materials has decreased compared to the values observed before cycling, but the impedance of the $Cu_2Sb$—C is higher than that of $Cu_2Sb$—$Al_2O_3$—C in the medium-to-low and low frequency ranges. After 20 cycles (FIG. 8C), the difference in the impedance response of $Cu_2Sb$—C and $Cu_2Sb$—$Al_2O_3$—C is even more significant, and $Cu_2Sb$—$Al_2O_3$—C exhibits lower resistance in all frequency ranges.

Example 7

Figure 7:
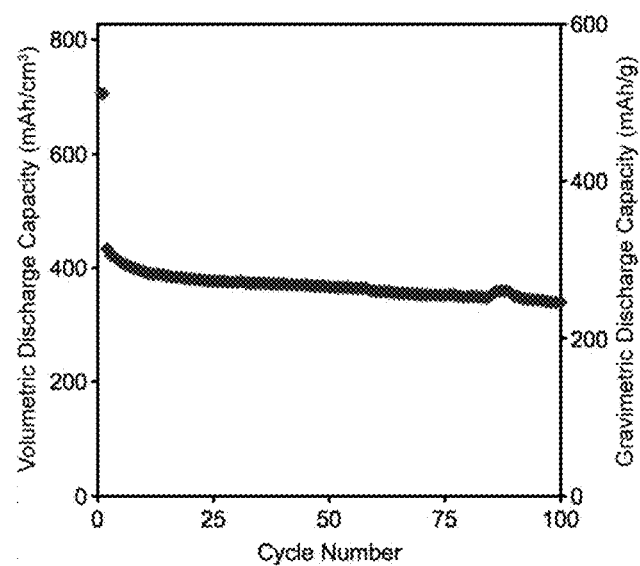
FIG. 7 provides cycle performance of a $Cu_2Sb$—$Al_2O_3$—C and $LiMn_2O_4$ spinel pouch cell at 25° C. between 0-2 V vs. $Li/Li^+$ at a current of 100 mA/g of active electrode material.

Resistance of $Cu_2Sb$—$Al_2O_3$—C Nanocomposite Material to Manganese Poisoning One of the drawbacks to using carbon anode materials alongside commercial $LiMn_2O_4$ spinel cathodes is the poisoning of the anode by the manganese ions ($Mn^{2+}$) that dissolve from the cathode lattice during cycling. In order to test the resistance of $Cu_2Sb$—$Al_2O_3$—C to manganese poisoning, 3-electrode pouch cells were constructed with $Cu_2Sb$—$Al_2O_3$—C as the working electrode, 4 V manganese spinel material as the counter electrode, and lithium metal as the reference electrode. The cycle performance of the $Cu_2Sb$—$Al_2O_3$—C material in the pouch cell does not change significantly from that of the coin cell, suggesting that $Cu_2Sb$—$Al_2O_3$—C anodes may be resistant to $Mn^{2+}$ poisoning and can be used with manganese spinel cathodes in lithium-ion cells. The performance of the $Cu_2Sb$—$Al_2O_3$—C pouch cell is shown in FIG. 7.

Example 8

Formation and Analysis of $Cu_6Sn_5$—TiC—C Nanocomposite Material and Electrodes and Coin Cells Containing this Material $Cu_6Sn_5$—TiC—C material as anodes and coin cells containing this material were prepared and experiments were carried out in a manner similar to that used for $Cu_2Sb$—$Al_2O_3$—C in Example 1 above. In particular, $Cu_6Sn_5$—TiC—C nanocomposite material was prepared by first obtaining a mixture of Cu—Sn—Ti alloy phases by heating a mixture of Sn (99.8%, <45 μm, Aldrich), Cu (99%, 45 μm Acros Organics), and Ti (99.99%, ~325 mesh, Alfa Aesar) powders in an atomic ratio of 3:1:5 at 900° C. in a flowing Argon atmosphere for 12 h. The mixture of Cu—Sn—Ti phases was then mixed with 20 wt % acetylene black and subjected to high energy mechanical milling (HEMM) for 40 h at a speed of 500 rpm in a vibratory mill at ambient temperature under argon atmosphere to obtain the $Cu_6Sn_5$—TiC—C nanocomposite.

Testing of this material shows desirable material properties similar to those obtained with $Cu_2Sb$—$Al_2O_3$—C. In particular, the presence of $Cu_6Sn_5$ in a conductive matrix of TiC and —C was verified as was the presence of a Cu framework containing electrochemically active Sn particles. The conductive matrix improves the cycle life of $Cu_6Sn_5$ as compared to the performance data for $Cu_6Sn_5$ alone available in scientific literature.

Example 9

X-Ray Diffraction Analysis Cu$_6$Sn$_5$—TiC—C Nanocomposite Material

Samples were characterized with a Rigaku X-ray diffractometer with Cu Kα radiation, Hitachi S-5500 STEM, and JEOL 2010 TEM operating at 300 kV. The STEM and TEM samples were prepared by dispersing the sample in ethanol, depositing it drop wise onto a carbon-coated copper grid, and removing the ethanol at ambient temperature. The electrodes for the electrochemical evaluation were prepared by mixing 70 wt % active material (Cu$_6$Sn$_5$—TiC—C) powder, 15 wt % carbon black (Super P), and 15 wt % polyvinylidene fluoride (PVDF) in N-methylpyrrolidone (NMP) to form a slurry. The slurry was spread onto a copper foil and dried at 120° C. for 2 h under vacuum. The electrodes were then assembled into CR2032 coin cells in an Ar-filled glove box using Celgard polypropylene separator, lithium foil as the counter electrode, and 1M LiPF$_6$ in ethylene carbonate (EC)/diethyl carbonate (DEC) (1:1 v/v) electrolyte. The discharge-charge experiments were performed galvanostatically at a constant current density of 100 mA/g of active material within the voltage range of 0-2.0 V vs. Li/Li$^+$ or 0.2 V-OCV vs. Li/Li$^+$ Cycle testing was performed at 25° C.

FIG. 11 shows the XRD pattern of the Cu$_6$Sn$_5$—TiC—C sample. This sample exhibits peaks corresponding to crystalline Cu$_6$Sn$_5$ (JCPDS No. 00-045-1488) and TiC (JCPDS No. 00-032-1383) and confirms the formation of Cu$_6$Sn$_5$ and TiC. The carbon in the composite is not highly crystalline and does not appear in the XRD pattern.

Figures 18A, 18B, 18C, 18D, 18E, 18F:
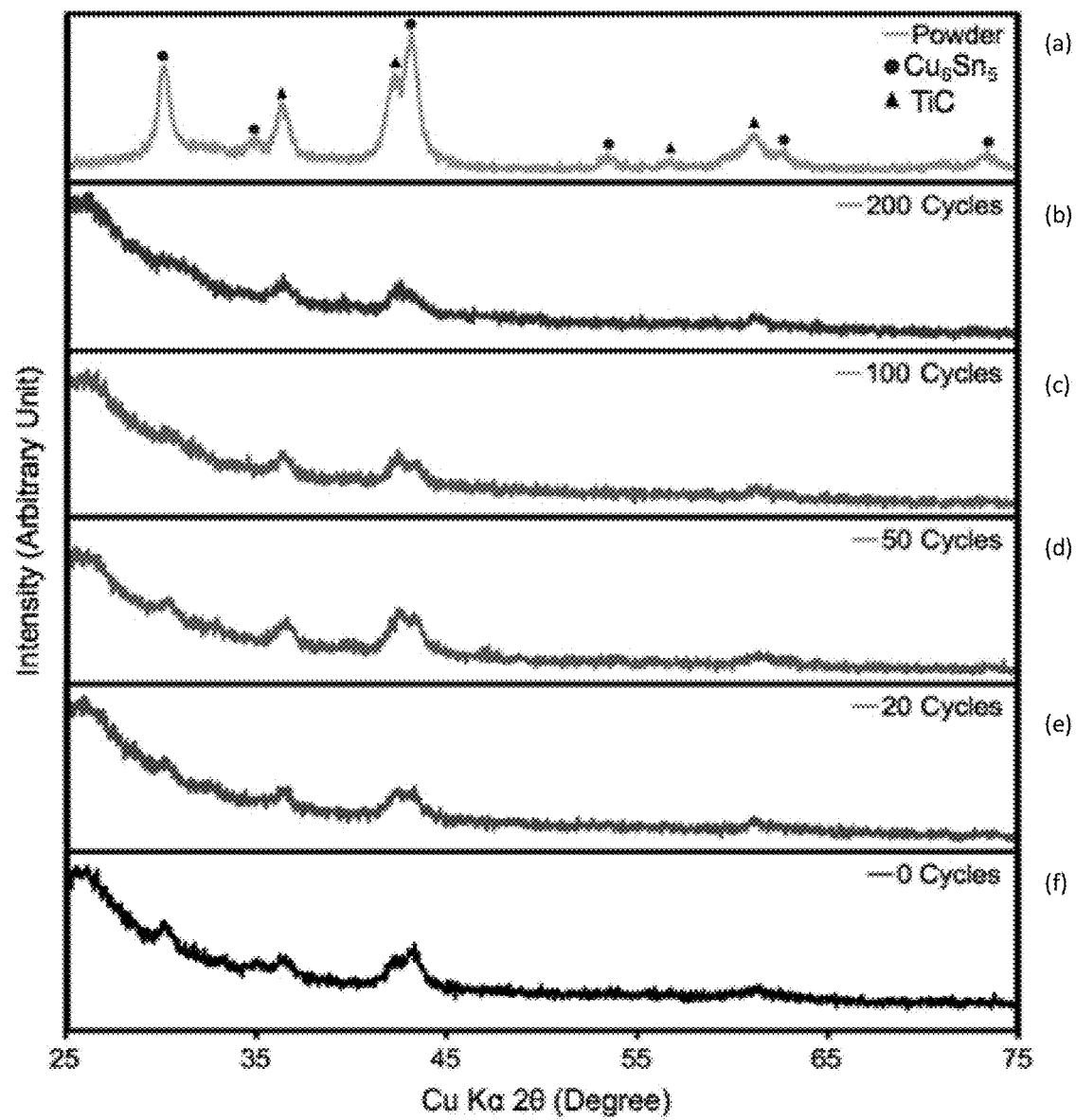
FIG. 18A provides an XRD pattern of CuSn—TiC—C powder before electrode formation.
FIG. 18B provides an XRD pattern of CuSn—TiC—C from an electrode after 200 cycles.
FIG. 18C provides an XRD pattern of CuSn—TiC—C from an electrode after 100 cycles.
FIG. 18D provides an XRD pattern of CuSn—TiC—C from an electrode after 50 cycles.
FIG. 18E provides an XRD pattern of CuSn—TiC—C from an electrode after 20 cycles.
FIG. 18F provides an XRD pattern of CuSn—TiC—C from an electrode after 0 cycles.

In order to better understand the changes in morphology of the Cu$_6$Sn$_5$—TiC—C material during cycling, XRD was performed on electrode materials that had been fully discharged down to 0 V vs. Li/Li$^+$ and cycled between 0 and 200 cycles. After 200 cycles, the capacity of the Cu$_6$Sn$_5$—TiC—C electrode had been reduced to less than one percent of the original capacity. FIG. 18 shows the XRD patterns of Cu$_6$Sn$_5$—TiC—C electrodes after up to 200 cycles. The XRD patterns do not change significantly for the electrodes that have been cycled, even after the material stops showing any appreciable capacity. This indicates that the particles are not agglomerating or significantly changing in size.

Example 10

SEM and TEM Analysis of CuSn—TiC—C Nanocomposite Material

Figures 12A, 12B, 12C, 12D, 12E, 12F:
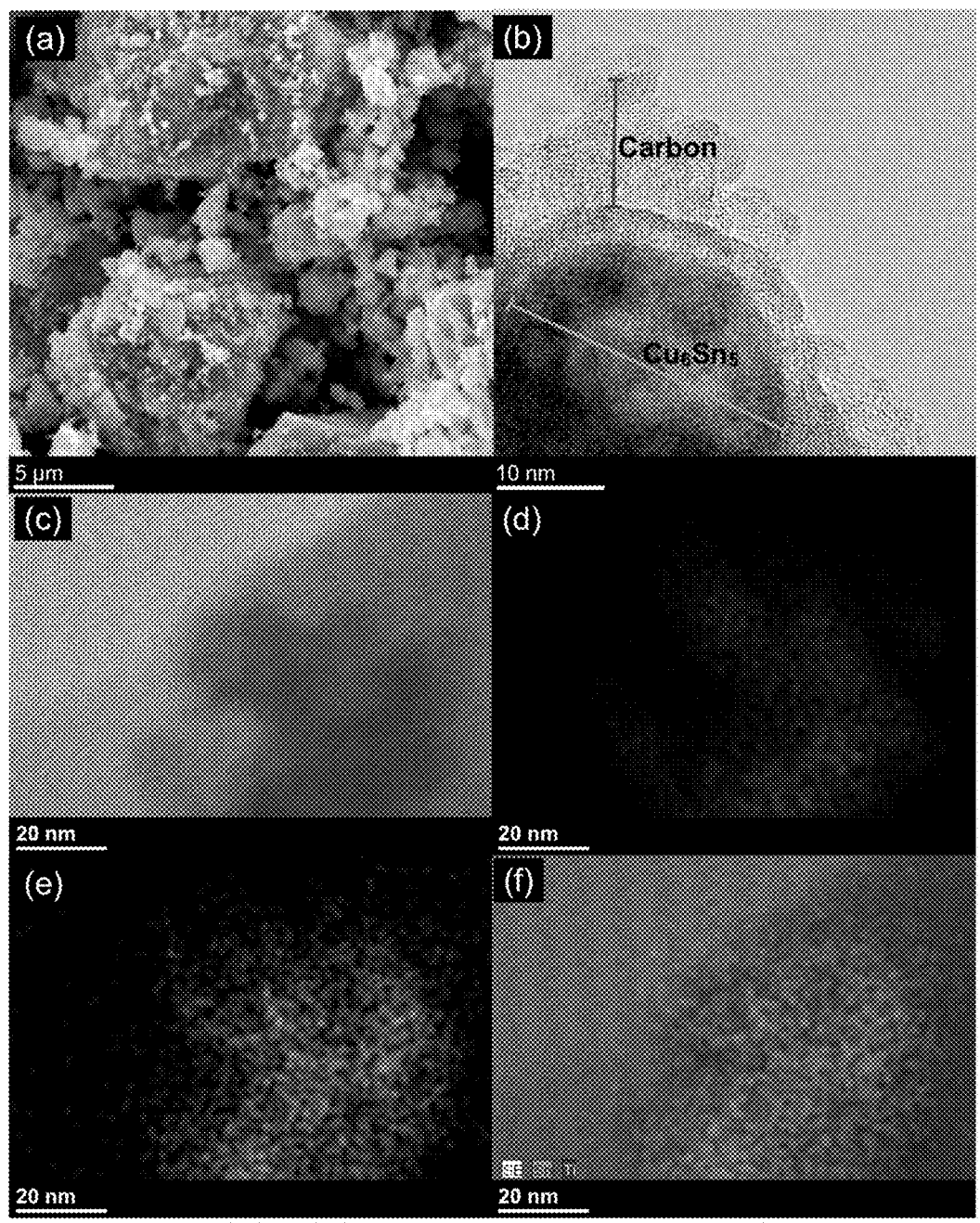
FIG. 12A provides a SEM image of CuSn—TiC—C.
FIG. 12B provides a TEM image of CuSn—TiC—C.
FIG. 12C provides an STEM image of CuSn—TiC—C.
FIG. 12D provides an element map of Ti in CuSn—TiC—C.
FIG. 12E provides an element map of Sn in CuSn—TiC—C.
FIG. 12F provides a composite element map of Ti and Sn in CuSn—TiC—C.

FIG. 12 shows the SEM, TEM, and STEM element mapping images of the Cu$_6$Sn$_5$—TiC—C nanocomposite. The SEM image in FIG. 12A shows the large particles of carbon (acetylene), with the smaller Cu$_6$Sn$_5$ and TiC particles blended and stuck to the carbon. The TEM image in FIG. 12B shows the highly crystalline nature of a ~30 nm Cu$_6$Sn$_5$ particle. The particle in the TEM image appears to be coated with a layer of either carbon or TiC, but lattice fringes could not be observed for TiC. The distribution of particle sizes observed via TEM was between 10 and 200 nm. The STEM images shown in FIGS. 12D-F reveal presence of Ti on the Cu$_6$Sn$_5$ particles. The TiC does not appear to be a homogenous coating on the particles but rather is present as heterogeneous marbling on the outside of the particles. TEM data from electrodes containing Cu$_2$Sb—Al$_2$O$_3$—C that were cycled between 1 and 200 cycles shows that Cu$_6$Sn$_5$ particles do not agglomerate in the material and that the morphology of the particles does not change during extended cycling.

Figures 17A, 17B, 17C, 17D, 17E, 17F:
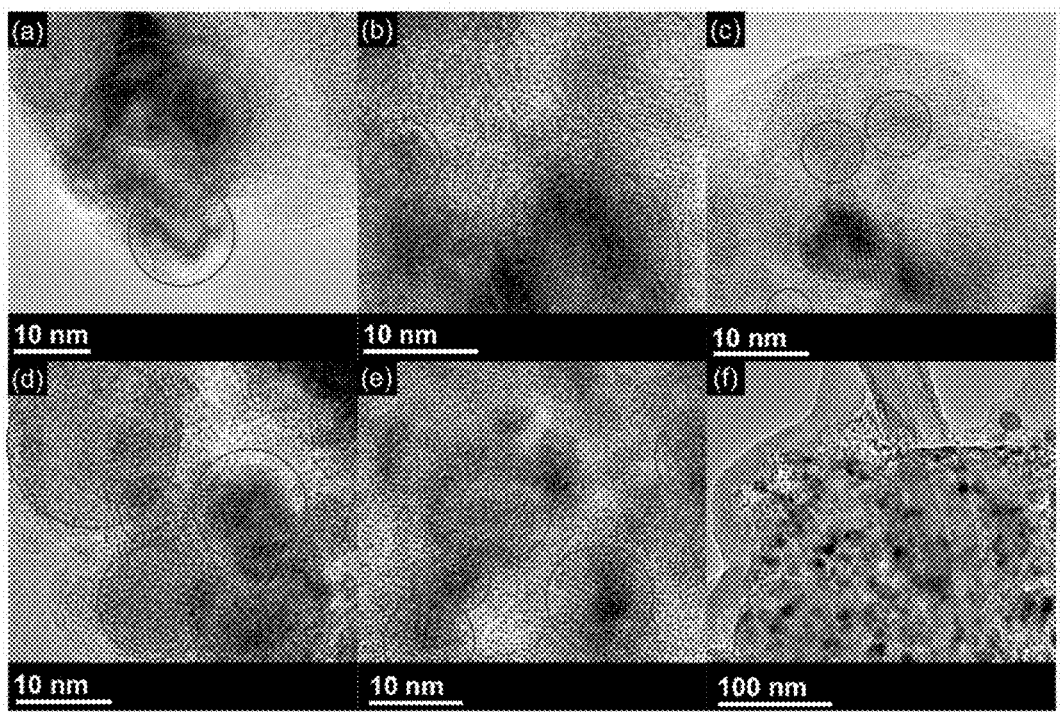
FIG. 17A provides a TEM image of a CuSn—TiC—C electrodes after 0 cycles.
FIG. 17B provides a TEM image of a CuSn—TiC—C electrodes after 20 cycles.
FIG. 17C provides a TEM image of a CuSn—TiC—C electrodes after 50 cycles.
FIG. 17D provides a TEM image of a CuSn—TiC—C electrodes after 100 cycles.
FIGS. 17E and 17F provide TEM images of a CuSn—TiC—C electrodes after 200 cycles.

The cycled electrodes used in Example 9 further analyzed via TEM. The results of the XRD on cycled Cu$_6$Sn$_5$—TiC—C electrodes are further supported by the TEM images in FIG. 17. The TEM images show that the morphology and size of the Cu$_6$Sn$_5$ particles do not change significantly during cycling, even after the material has failed.

Example 11

Electrochemical Analysis of Cu$_6$Sn$_5$—TiC—C Nanocomposite Material

Figure 13:
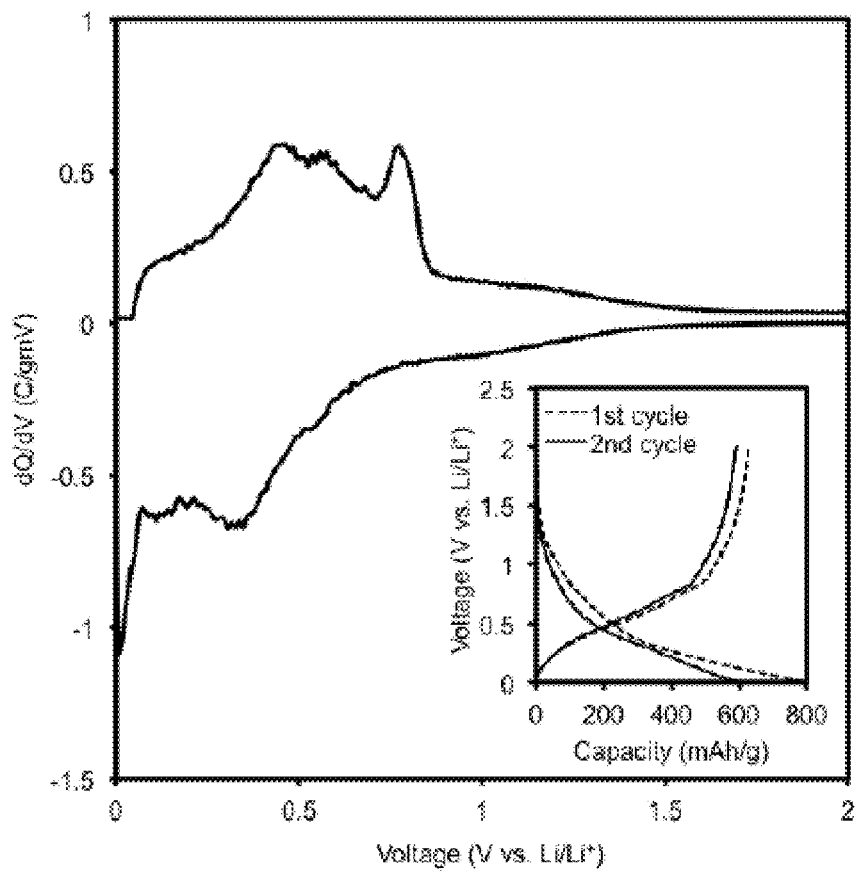
FIG. 13 provides a voltage profile and differential capacity plot CuSn—TiC—C at 25° C. and a current of 100 mA/g of active electrode material between 0-2 V vs. $Li/Li^+$.
Figure 15:
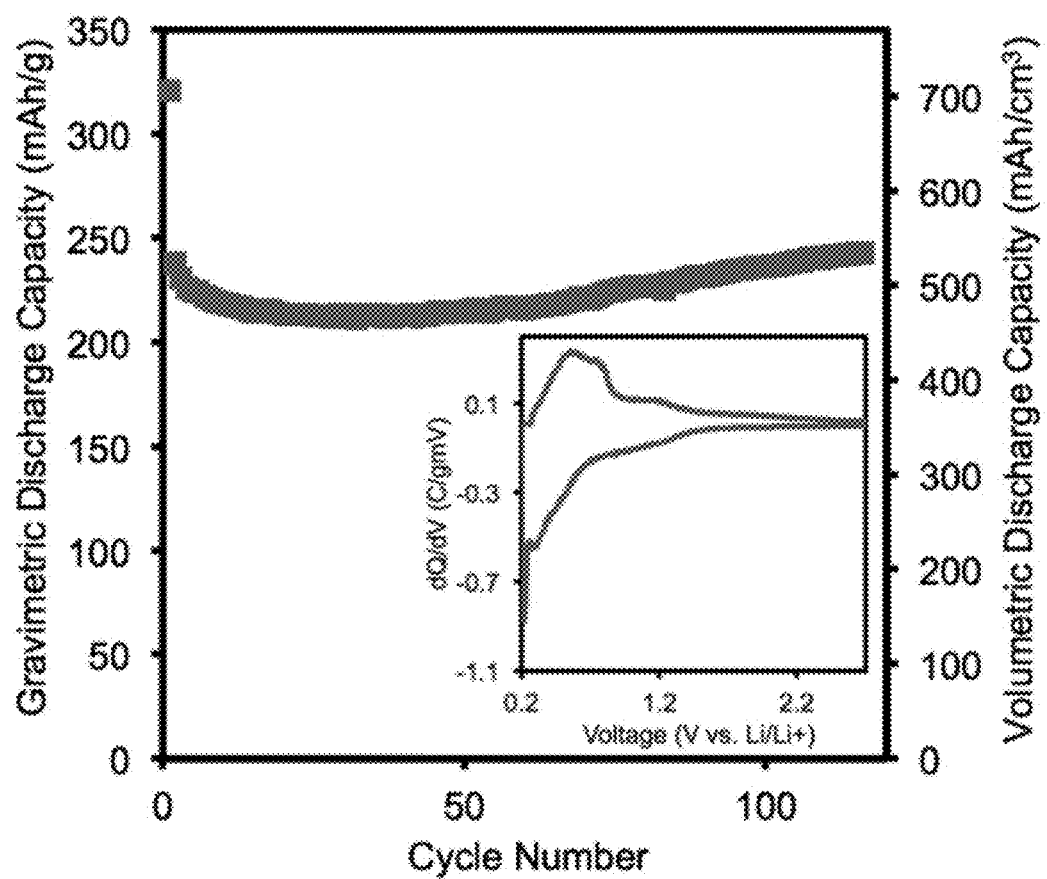
FIG. 15 provides the volumetric and gravimetric discharge capacity of CuSn—TiC—C and commercial graphite from 0.2 V-2.7 V (OCV) vs. $Li/Li^+$ at 25° C. and a current rate of 100 mA/g of active electrode material and a differential capacity plot of the second cycle (inset).

The voltage profile and differential capacity plot of the Cu$_6$Sn$_5$—TiC—C nanocomposite are shown in FIG. 13. When cycled between 0 and 2 V vs. Li/Li$^+$, the nanocomposite exhibits first discharge and charge capacities of 797 and 629 mAh/g, respectively. When the material is cycled between 0.2 V vs. Li/Li$^+$ and the open circuit voltage (OCV) for the material, the first discharge and charge capacities are 321 mAh/g and 225 mAh/g, respectively, which indicates that the irreversible capacity loss is 96 mAh/g and the coulombic efficiency is around 70%. The irreversible capacity loss may be largely associated with the reduction of the electrolyte on the active material surface and the formation of solid-electrolyte interfacial (SEI) layer. The major peaks in the differential capacity plot (FIG. 13) when the material is cycled down to 0 V vs. Li/Li$^+$ occur around 0.35 V and 0.13 V vs. Li/Li$^+$. When the material is cycled between 0.2 V vs. Li/Li$^+$ and the open circuit voltage (OCV) for the material, only one peak is observed in the discharge cycle, at around 0.31V vs. Li/Li$^+$ (FIG. 15, inset). This change in the differential capacity plot and the corresponding reduction in capacity indicate that the reaction of lithium with Cu$_6$Sn$_5$ is not complete when the material is discharged down to 0.2 V vs. Li/Li$^+$ however a drastic improvement in cycle life is observed. The improvement in cycle life when the Cu$_6$Sn$_5$ material is kept above 0.2 V vs. Li/Li$^+$ is likely due to the avoidance of the significant structural changes that occur when Cu is extruded from the Cu$_6$Sn$_5$ material and replaced with additional lithium to achieve Li$_{4.4}$Sn.

Based upon the differential capacity plot, and the previously published reaction mechanism for Cu$_6$Sn$_5$, the reaction mechanism for the Cu$_6$Sn$_5$—TiC—C material is as follows:

$$10Li + Cu_6Sn_5 \rightarrow 5\, Li_2CuSn + Cu \quad (1)$$

$$2.2Li + Li_2CuSn \rightarrow Li_{4.4}Sn + Cu \quad (2)$$

This reaction mechanism is consistent with what has been published in the literature for Cu$_6$Sn$_5$ materials. When the material is discharged to 0.2 V vs. Li/Li$^+$, step two of the above reaction mechanism does not occur.

Figures 14A, 14B, 14C, 14D:
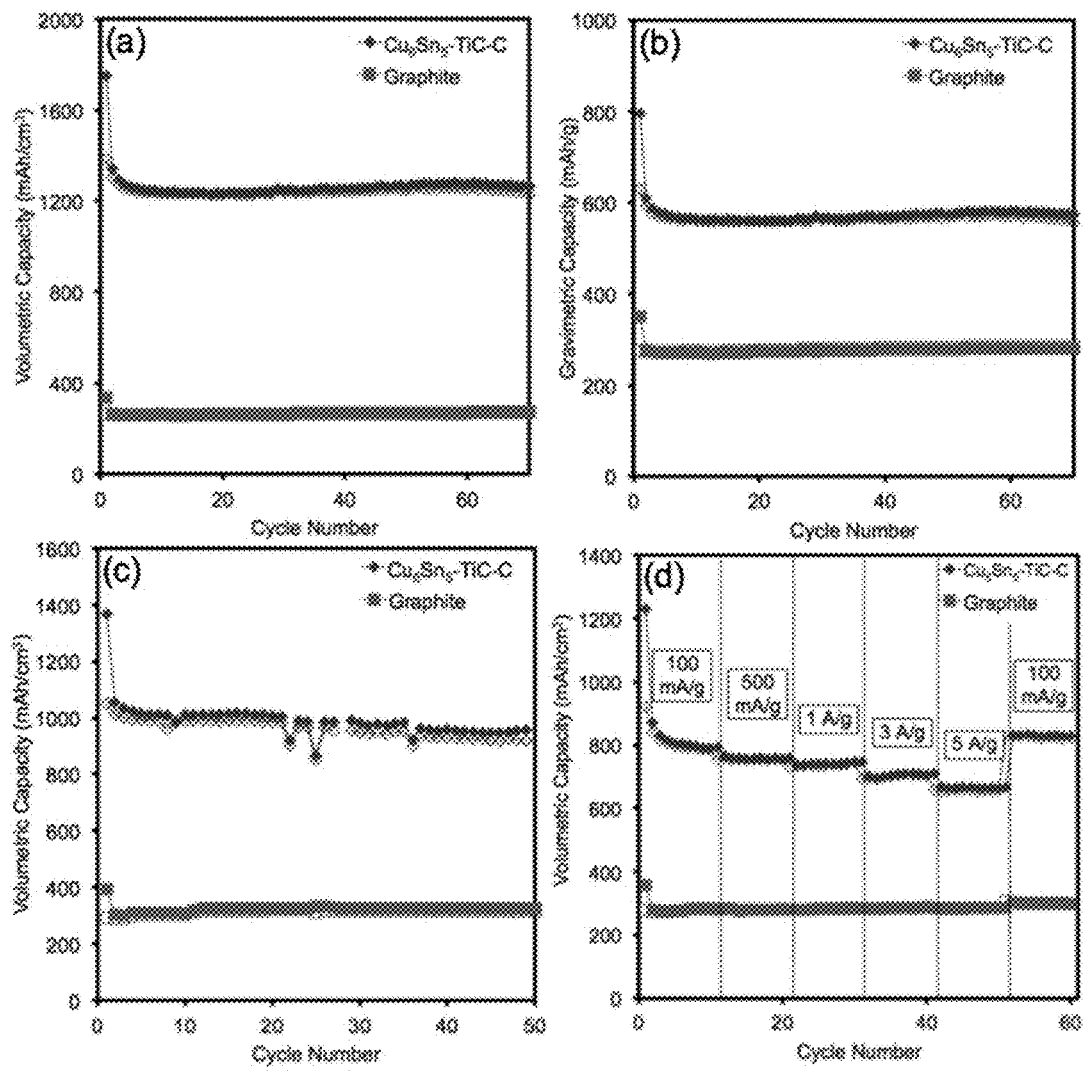
FIG. 14A provides the volumetric discharge capacity of CuSn—TiC—C and commercial graphite from 0-2.0 V vs. $Li/Li^+$ at 25° C. and a current rate of 100 mA/g of active electrode material.
FIG. 14B provides the gravimetric discharge capacity of CuSn—TiC—C and commercial graphite from 0-2.0 V vs. $Li/Li^+$ at 25° C. and a current rate of 100 mA/g of active electrode material.
FIG. 14C provides the volumetric discharge capacity of CuSn—TiC—C and commercial graphite from 0-2.0 V vs. $Li/Li^+$ at 55° C. and a current rate of 100 mA/g of active electrode material.
FIG. 14D provides the rate capability comparison of CuSn—TiC—C and commercial graphite at 25° C. between 0-2 V vs. $Li/Li^+$.

FIG. 14 compares the cyclability of Cu$_6$Sn$_5$—TiC—C and graphite at different temperatures and rates of charge. Cu$_6$Sn$_5$—TiC—C shows a volumetric discharge capacity that is four times that of graphite, a gravimetric discharge capacity that is twice that of graphite and stable for 70 cycles when both materials are cycled between 0-2.0 V vs. Li/Li$^+$ at 25° C. and a current rate of 100 mA/g of active electrode material. At 55° C. and a current rate of 100 mA/g, as shown in FIG. 14C, the volumetric capacity is less stable for Cu$_6$Sn$_5$—TiC—C than at 25° C., but it is three times the volumetric capacity of graphite. FIG. 14D compares the excellent rate capability of the Cu$_6$Sn$_5$—TiC—C nanocomposite with that of graphite. Even at a rate of 5 A/g active material, $Cu_6Sn_5$—TiC—C shows higher capacity than that of graphite.

In summary, the second cycle discharge capacity of the $Cu_6Sn_5$—TiC—C was 1340 mAh/cm³ (610 mAh/g) and the tap density was 2.2 g/cm³. The volumetric capacity of $Cu_6Sn_5$—TiC—C is approximately 4.5 times higher than a graphite anode. $Cu_6Sn_5$—TiC—C also exhibits low impedance (described in further detail in Example 12) and good rate capacity.

Example 12

EIS Analysis of Electrodes Containing $Cu_6Sn_5$—TiC—C Nanocomposite Material

Electrochemical impedance spectroscopic analysis (EIS) was conducted with a Solartron SI1260 impedance analyzer by applying a 10 mV amplitude signal in the frequency range of 10 kHz to 0.001 Hz. $Cu_6Sn_5$—TiC—C served as the working electrode and lithium foil served as the counter and reference electrodes. The impedance response was measured after zero, one, and 20 charge-discharge cycles at 2 V vs. $Li/Li^+$.

Figure 16:
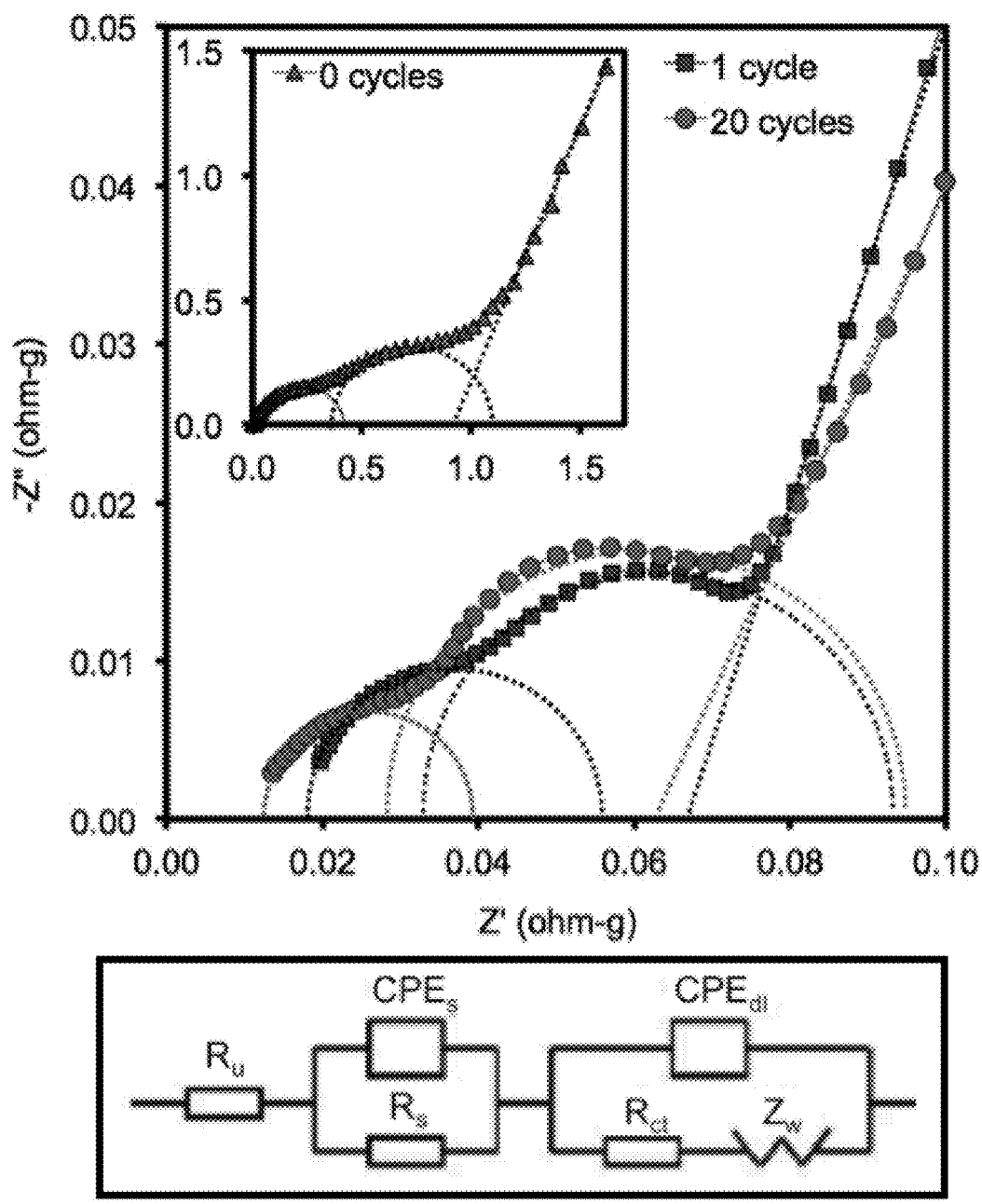
FIG. 16 provides the equivalent circuit used for the impedance measurements and electrochemical impedance spectra (EIS) of the CuSn—TiC—C nanocomposite material before cycling (inset), after the 1st cycle, and after the 20th cycle.

To gain insight into the electrochemical performance of $Cu_6Sn_5$—TiC—C EIS measurements were conducted at 2 V vs. $Li/Li^+$ before cycling, after the 1st cycle, and after the 20th cycle. The EIS data were analyzed based on an equivalent circuit given in FIG. 16. In FIG. 16, $R_u$ refers to uncompensated resistance between the working electrode and the lithium reference electrode, $CPE_s$ refers to the constant phase element of the surface layer, $R_s$ refers to the resistance of the SEI layer, $CPE_{dl}$ refers to the constant phase element of the double layer, $R_{ct}$ refers to the charge-transfer resistance, and $Z_w$ refers to the Warburg impedance. Generally, the EIS spectrum can be divided into three frequency regions, i.e., low-frequency, medium-to-low-frequency, and high-frequency regions, which correspond, respectively, to the geometric capacitance of the cell, the charge-transfer reaction, and the lithium-ion diffusion through the surface layer. The EIS spectra recorded before cycling, after one cycle, and after 20 cycles in FIG. 16 consist of two semicircles and a line. The diameter of the semicircle in the high-frequency region (lowest Z' values) is a measure of the resistance $R_s$ of the SEI layer. The diameter of the semicircle in the medium-frequency region (middle Z' values) is a measure of the charge-transfer resistance $R_{ct}$, which is related to the electrochemical reaction between the particles or between the electrode and the electrolyte. The portion of the impedance curve that has a linear slope is related to lithium-ion diffusion in the bulk of the active material.

Before cycling (FIG. 16, inset), the $Cu_6Sn_5$—TiC—C sample exhibits $R_s$, $R_{ct}$, and bulk diffusion resistances that are all an order of magnitude larger than the resistances of the $Cu_6Sn_5$—TiC—C samples after 1 or 20 cycles. After the first cycle, the SEI layer has formed and the majority of the irreversible capacity loss has occurred. As a consequence to the formation of the SEI layer, the overall impedance in all frequency ranges decreases after the first cycle. After 20 cycles, the discharge capacity has begun to increase slightly, and this may be due to a decrease in bulk diffusion and surface resistance. When comparing the charge transfer resistance between the first and $20^{th}$ cycle, it was observed that the charge transfer resistance of the sample that had been cycled 20 times was higher, though not significantly. An increase in the charge transfer resistance after 20 cycles indicates that the electrochemical reactions between the particles or between the electrode and the electrolyte are becoming more difficult.

Example 13

Formation of $Mo_3Sb_7$—C Material and Electrodes and Coin Cells Containing this Material $Mo_3Sb_7$—C and $Mo_3Sb_7$ materials as well as electrodes and coin cells using these materials were prepared as described in this Example 13.

First, the $Mo_3Sb_7$ alloy powders were obtained by heating a mixture of required amounts of Sb (99.9%, Aldrich, St. Louis, Mo.) and Mo (99.8%, Aldrich) powders at 780° C. in a flowing 5% $H_2$ atmosphere for 18 h. The $Mo_3Sb_7$ alloy obtained was then ground and sieved to eliminate particles over 100 μm. The $Mo_3Sb_7$ powder with particle size <100 μm was then mixed with 20 wt % acetylene black and subjected to high energy mechanical milling (HEMM) for 12 h at a speed of 500 rpm in a vibratory mill at ambient temperature under argon atmosphere to obtain the $Mo_3Sb_7$—C composite.

Electrodes for electrochemical evaluation were prepared by mixing 70 wt % active material ($Mo_3Sb_7$—C) powder, 15 wt % carbon black (Super P), and 15 wt % polyvinylidene fluoride (PVDF) in N-methylpyrrolidone (NMP) to form a slurry. The slurry was spread onto a copper foil and dried at 120° C. for 2 h under vacuum. The electrodes were then assembled into CR2032 coin cells in an Ar-filled glove box using Celgard polypropylene separator, lithium foil as the counter electrode, and 1M $LiPF_6$ in ethylene carbonate (EC)/diethyl carbonate (DEC) (1:1 v/v) electrolyte.

Example 14

X-Ray Diffraction Analysis of $Mo_3Sb_7$—C Material

Figure 19:
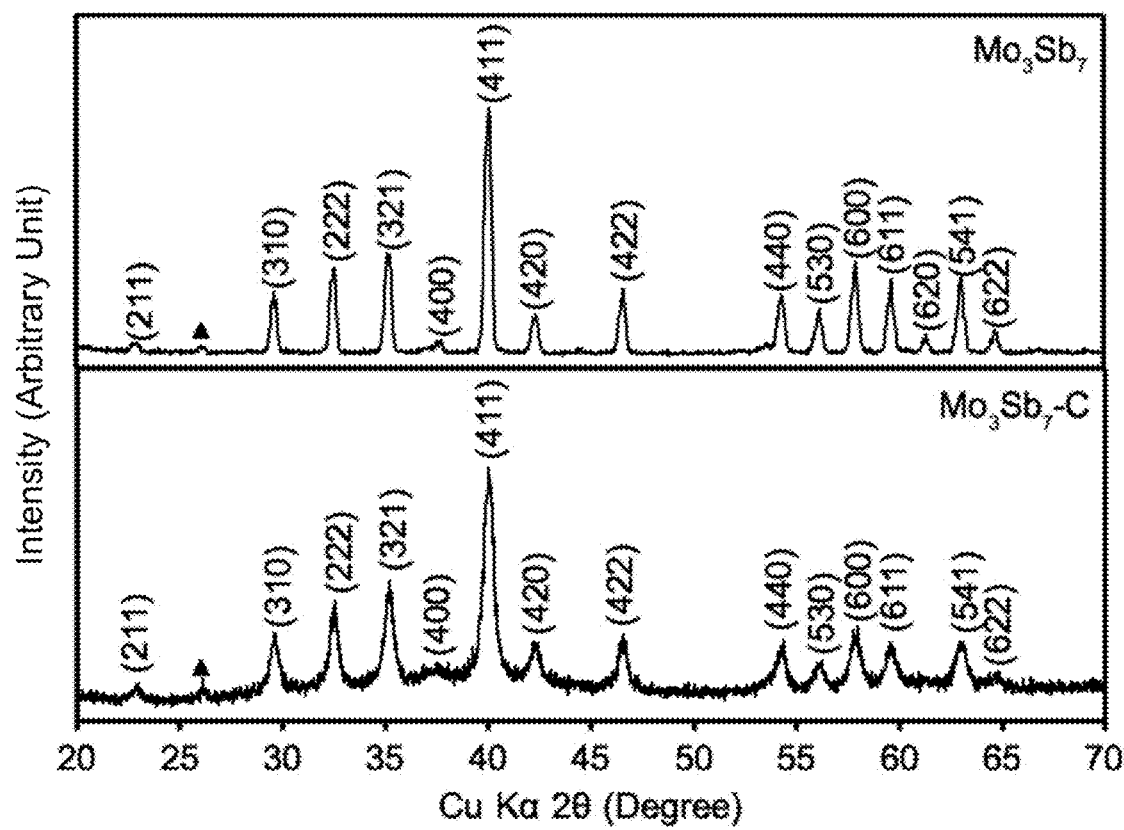
FIG. 19 provides XRD patterns of $Mo_3Sb_7$ and $Mo_3Sb_7$—C composite materials. The reflections marked with a closed triangle correspond to an $MoO_2$ impurity phase.
Figure 20:
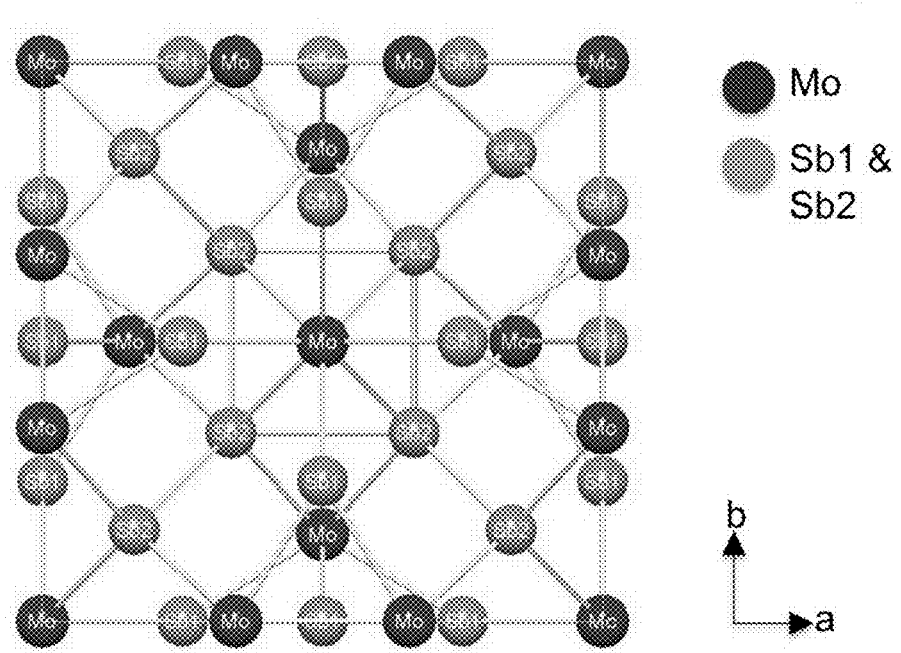
FIG. 20 provides the crystal structure of $Mo_3Sb_7$. The three types of atoms in the structure are labeled as Sb1, Sb2, and Mo.

Samples were characterized with a Phillips X-ray diffractometer with Cu Kα radiation. FIG. 19 shows the XRD patterns of the $Mo_3Sb_7$ and $Mo_3Sb_7$—C samples. Both samples exhibit sharp peaks corresponding to crystalline $Mo_3Sb_7$ (JCPDS No. 019-0807), with a small peak corresponding to a trace amount of $MoO_2$ (JCPDS No. 032-0671), but without any peaks corresponding to Mo (JCPDS No. 004-0809), Sb (JCPDS No. 005-0562), or $Sb_2O_3$ (JCPDS No. 005-0543), confirming the formation of $Mo_3Sb_7$. The unit cell consists of four $Mo_3Sb_7$ groups with a total of 12 Mo, 12 Sb1, and 16 Sb2 atoms and a lattice parameter a=9.5713±0.0008 Å. $Mo_3Sb_7$ has the cubic $Ir_3Ge_7$ structure consisting of two interlocking face-condensed antiprisms, as shown in FIG. 20. One of the interlocking antiprisms is formed by eight Sb2 atoms that surround each Sb1 atom. Each Sb1 atom is also surrounded by two tetrahedra; one tetrahedron is made up of four Mo atoms, and the other is made up of four Sb1 atoms. The other interlocking antiprism is a distorted square antiprism composed of a Mo atom coordinated to four Sb1 and four Sb2 atoms at the corners. In this structure, the Sb2 atoms are coordinated to three Mo atoms, one Sb2 atom, and six Sb1 atoms.

Figures 25A, 25B, 25C, 25D:
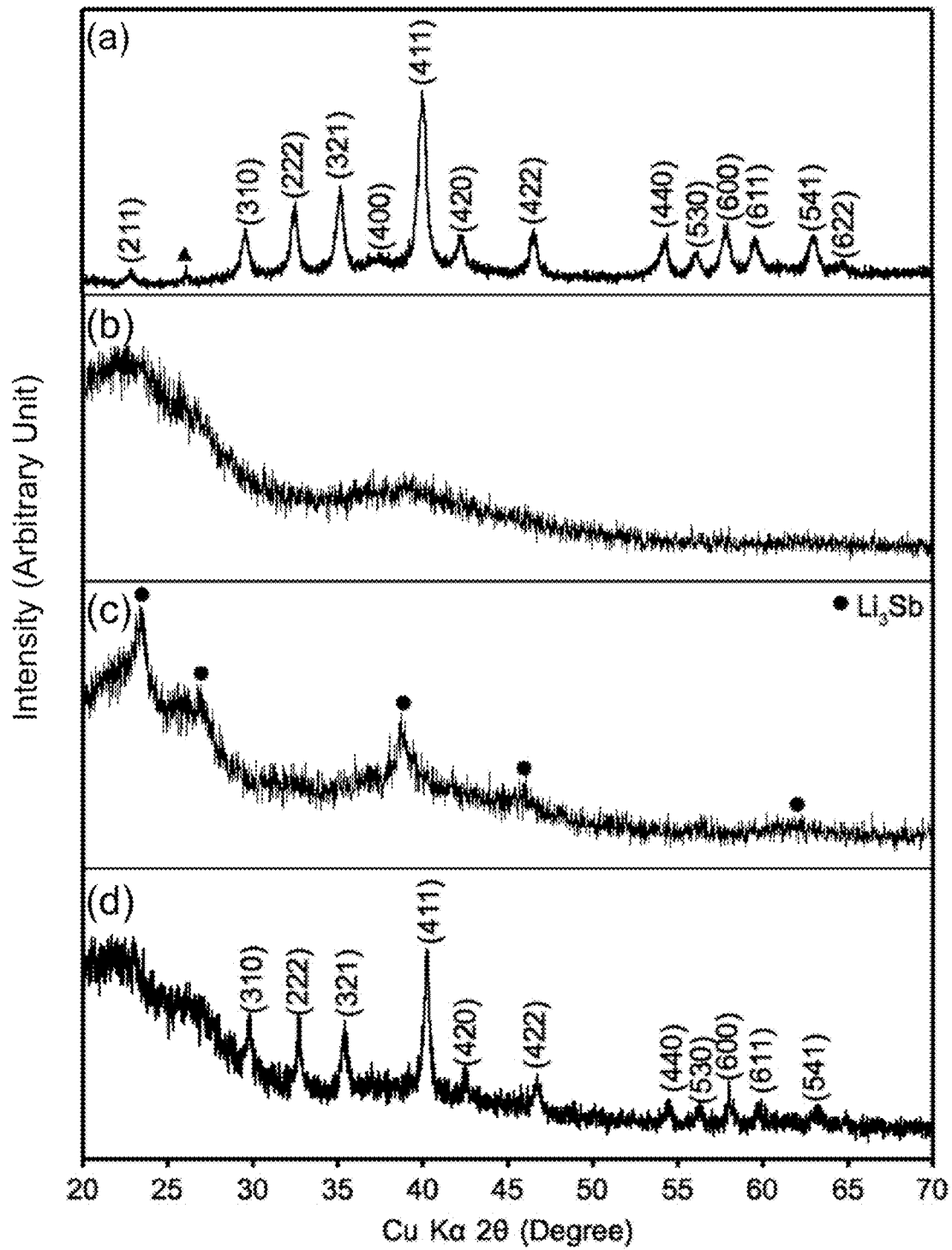
FIG. 25A provides an XRD pattern of $Mo_3Sb_7$—C not previously included in an electrode.
FIG. 25B provides an XRD pattern of an $Mo_3Sb_7$—C electrode that has been discharged to 0.45 V vs. $Li/Li^+$.
FIG. 25C provides an XRD pattern of an $Mo_3Sb_7$—C electrode that has been fully discharged.
FIG. 25D provides an XRD pattern of an $Mo_3Sb_7$—C electrode that has been fully charged.

To investigate the structural changes that may occur during electrochemical cycling, XRD data were collected on electrodes that had been cycled and then extracted from their cells. In order to investigate the structural changes that occur during electrochemical cycling, XRD data were collected on electrodes that had been cycled and then extracted from the cells. XRD patterns recorded with electrodes discharged to 0.45 V vs. Li/Li$^+$, fully discharged electrodes, and fully charged electrodes are shown in FIG. 25. The data indicate the complete disappearance of the crystalline Mo$_3$Sb$_7$ phase at 0.45 V vs. Li/Li$^+$, followed by the appearance of Li$_3$Sb when the electrode is in the fully-discharged state. When the electrode is then fully-charged, the crystalline Mo$_3$Sb$_7$ phase reappears. If the Mo is extruded as Mo metal from Mo$_3$Sb$_7$ during the discharge process as with other antimony-based alloy anode materials, then the XRD pattern would be expected to show peaks for Mo metal along with that for Li$_3$Sb in FIG. 25C. However, FIG. 25C does not show any peaks for Mo metal, suggesting either the Mo atoms remain in the framework of Li$_3$Sb or extruded as amorphous Mo metal.

Figures 30A, 30B:
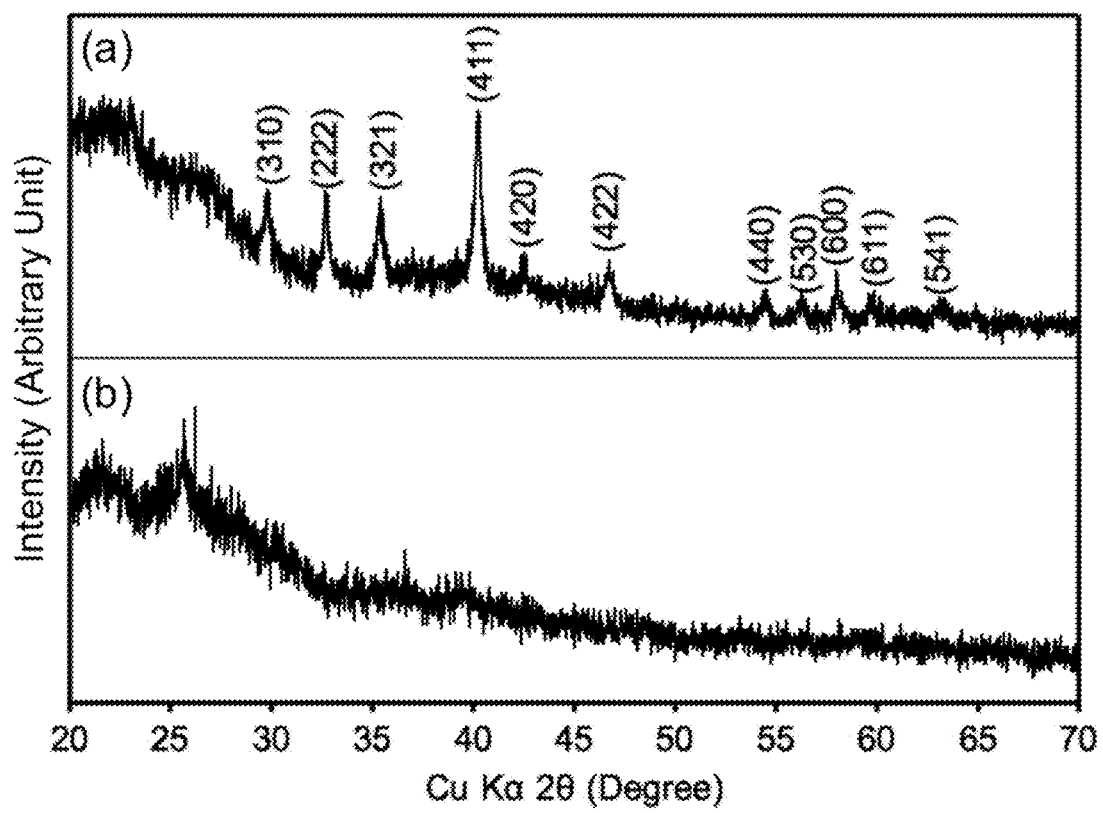
FIG. 30A provides an XRD pattern of $Mo_3Sb_7$—C after 1 cycle.
FIG. 30B provides an XRD pattern of $Mo_3Sb_7$—C after 111 cycles.

In order to better understand the source of the capacity fade in the Mo$_3$Sb$_7$—C sample, XRD was performed on electrode materials that had been cycled for greater than 100 cycles and showed severe capacity fade. FIG. 30 shows the XRD patterns of Mo$_3$Sb$_7$—C after one cycle and after 111 cycles. After one cycle (FIG. 30A), peaks for crystalline Mo$_3$Sb$_7$ were present in the XRD pattern. After 111 cycles (FIG. 30B), no peaks for crystalline Mo$_3$Sb$_7$ were observed.

Example 15

SEM and TEM Analysis of Mo$_3$Sb$_7$—C Material

Figure 21:
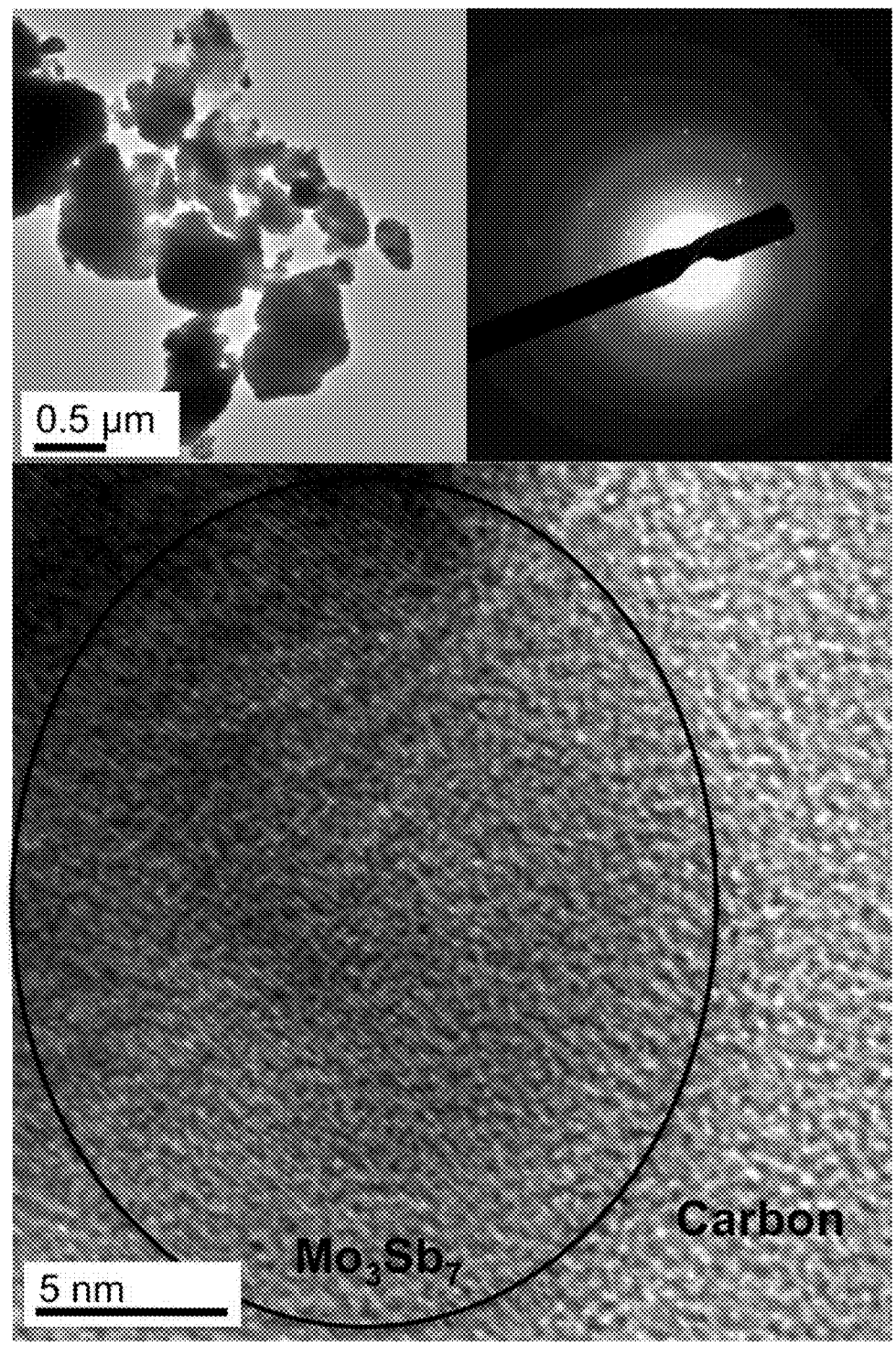
FIG. 21 provides high-resolution TEM images of $Mo_3Sb_7$—C, showing the highly-crystalline nature of the material.
Figures 22A, 22B, 22C, 22D:
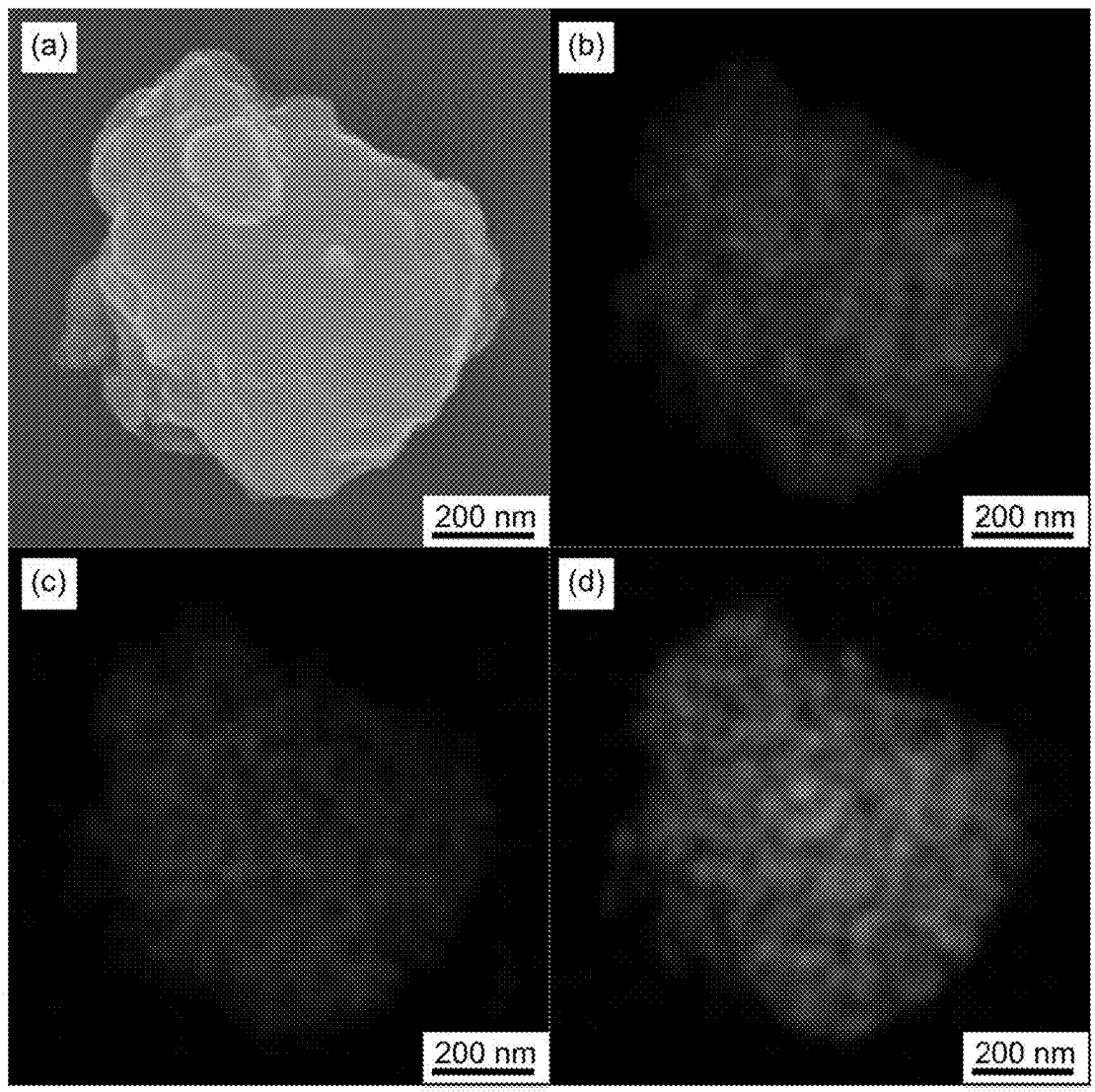
FIG. 22A provides an SEM image of a $Mo_3Sb_7$—C particle.
FIG. 22B provides an STEM element map of a $Mo_3Sb_7$—C particle showing the distribution of Sb.
FIG. 22C provides an STEM element map of a $Mo_3Sb_7$—C particle showing the distribution of C.
FIG. 22D provides an STEM element map of a $Mo_3Sb_7$—C particle showing the distribution of Mo.
Figures 23A, 23B, 23C:
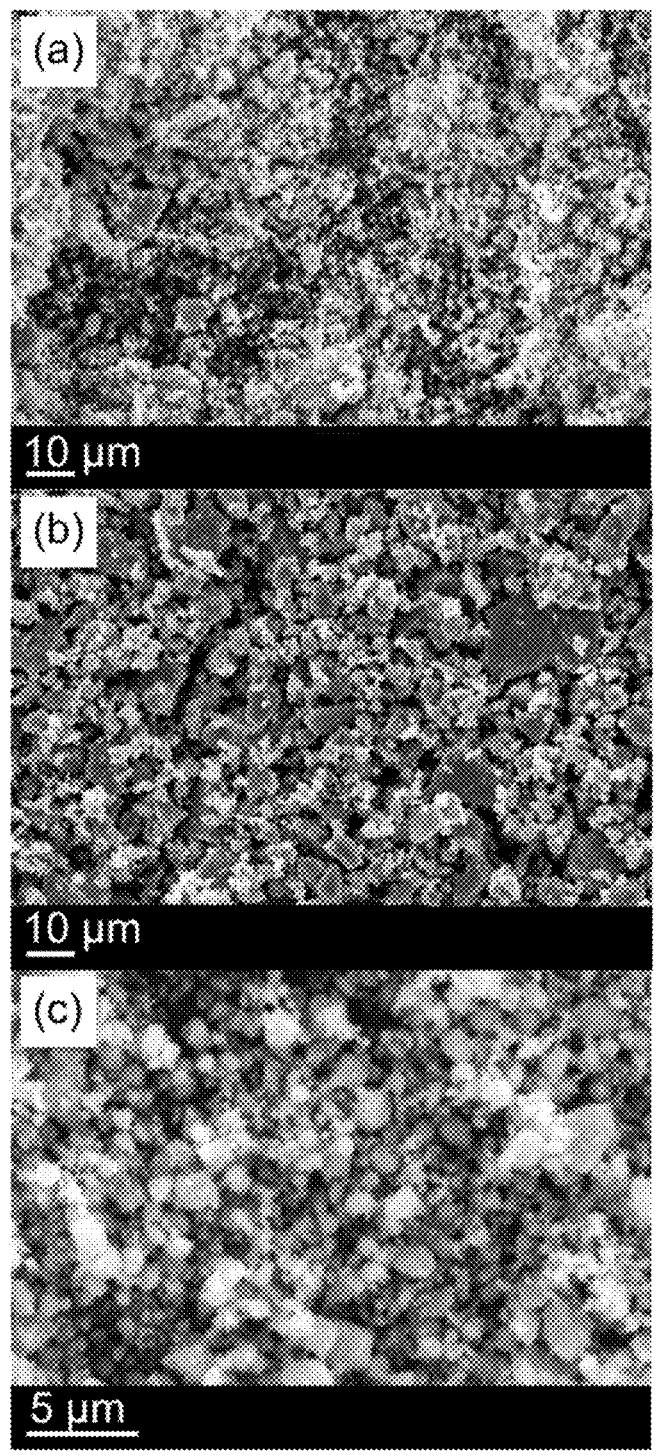
FIG. 23A provides an SEM image of $Mo_3Sb_7$—C.
FIG. 23B provides an SEM image of acetylene black.
FIG. 23C provides an SEM image of $Mo_3Sb_7$—C.

A Hitachi S-5500 STEM and a JEOL 2010 TEM operating at 300 kV were used. The STEM and TEM samples were prepared by dispersing the sample in ethanol, depositing it dropwise onto a carbon-coated copper grid, and removing the ethanol at ambient temperature. FIG. 21 shows the TEM images of the Mo$_3$Sb$_7$—C composite. The TEM images and diffraction pattern of Mo$_3$Sb$_7$—C show the highly crystalline nature of the material. The STEM images shown in FIG. 22 reveal the sub-micron particle size and a homogeneous distribution of Sb, Mo, and C in the Mo$_3$Sb$_7$—C composite. The SEM images of Mo$_3$Sb$_7$—C and acetylene in FIG. 23 show the sub-micron particle size distribution in the composite material, as well as the homogenous distribution of carbon and the Mo$_3$Sb$_7$.

Figure 31:
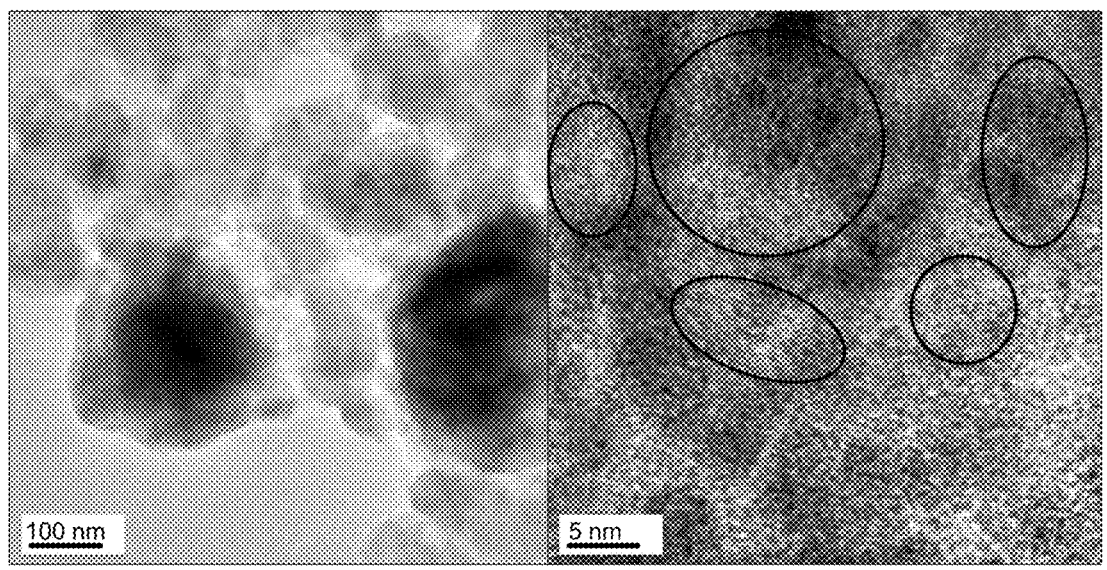
FIG. 31 provides high-resolution TEM images of $Mo_3Sb_7$—C after 111 charge-discharge cycles. The circles highlight isolated regions of crystalline $Mo_3Sb_7$ that are smaller than the crystalline regions present in the uncycled $Mo_3Sb_7$—C material.

Also in order to better understand the source of the capacity fade in the Mo$_3$Sb$_7$-C sample, high-resolution TEM was performed on electrode materials that had been cycled for greater than 100 cycles and showed severe capacity fade. From the TEM images in FIG. 31, small regions of crystalline Mo$_3$Sb$_7$ were detected, but are smaller and more isolated from one another than in the uncycled Mo$_3$Sb$_7$—C sample. The TEM data suggests that the capacity fade observed with Mo$_3$Sb$_7$—C at higher number of cycles is due to the breaking and separation of the large crystalline Mo$_3$Sb$_7$ particles that are present before cycling.

Example 16

Charge Discharge, Tap Density and Electrochemical Cycle Analysis of Electrodes Containing Mo$_3$Sb$_7$—C Material Discharge-charge experiments were performed galvanostatically at a constant current density of 100 mA/g of active material within the voltage range of 0-2.0 V vs. Li/Li$^+$. Cycle testing was performed at 25° C. Pouch lithium-ion cells consisting of the Mo$_3$Sb$_7$—C anode and a spinel manganese oxide cathode were also assembled and cycled at room temperature.

Figures 24A, 24B:
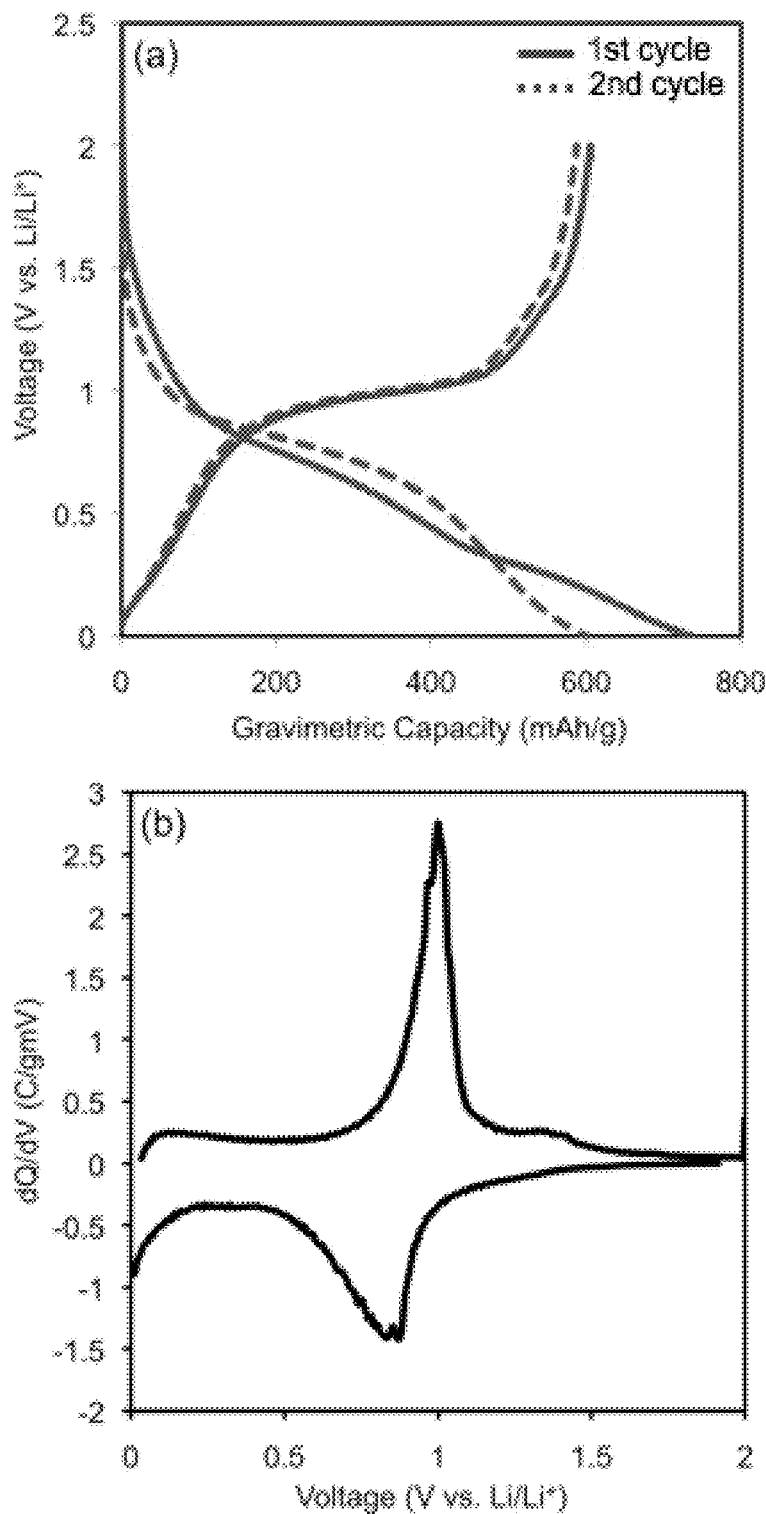
FIG. 24A provides a voltage profile of $Mo_3Sb_7$—C.
FIG. 24B provides a differential capacity plot for $Mo_3Sb_7$—C.

The voltage profile and differential capacity plot of the Mo$_3$Sb$_7$—C composite are shown in FIG. 24. The composite exhibits first discharge and charge capacities of 736 and 606 mAh/g, respectively, implying an irreversible capacity loss of 130 mAh/g and a coulombic efficiency of 82% in the first cycle for the composite. The irreversible capacity loss may be largely associated with the reduction of the electrolyte on the active material surface and the formation of solid-electrolyte interfacial (SEI) layer. The major peaks in the differential capacity plot (FIG. 24B), around 0.8 V vs. Li/Li$^+$ for alloying and around 1.0 V vs. Li/Li$^+$ for dealloying, correspond to the reaction of lithium with antimony. The electrochemical reaction between amorphous carbon and lithium appears as a broad peak below 0.2 V vs. Li/Li$^+$.

Figure 26:
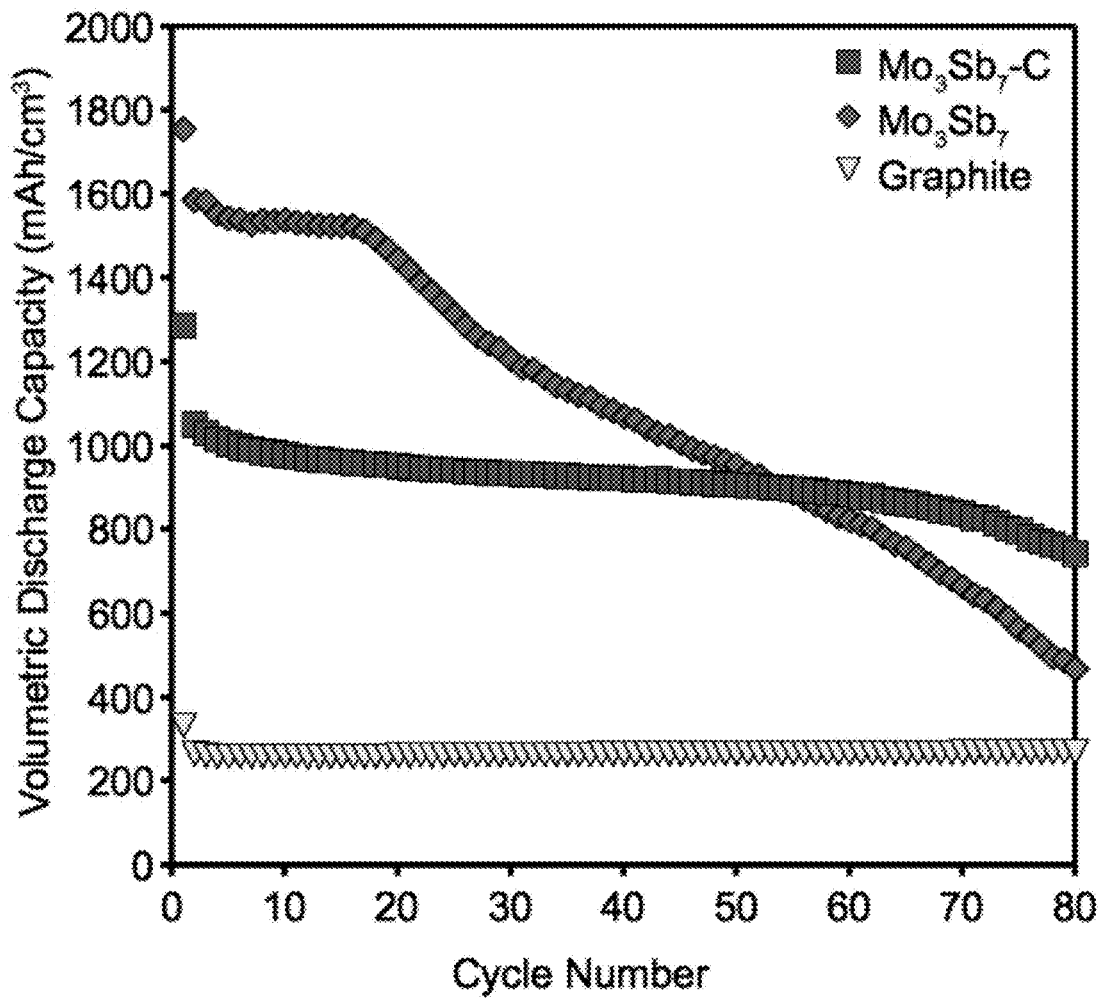
FIG. 26 provides a comparison of the cyclability of $Mo_3Sb_7$, $Mo_3Sb_7$—C, and graphite at 0-2 V vs. $Li/Li^+$ at a current of 100 mA/g active material.
Figure 27:
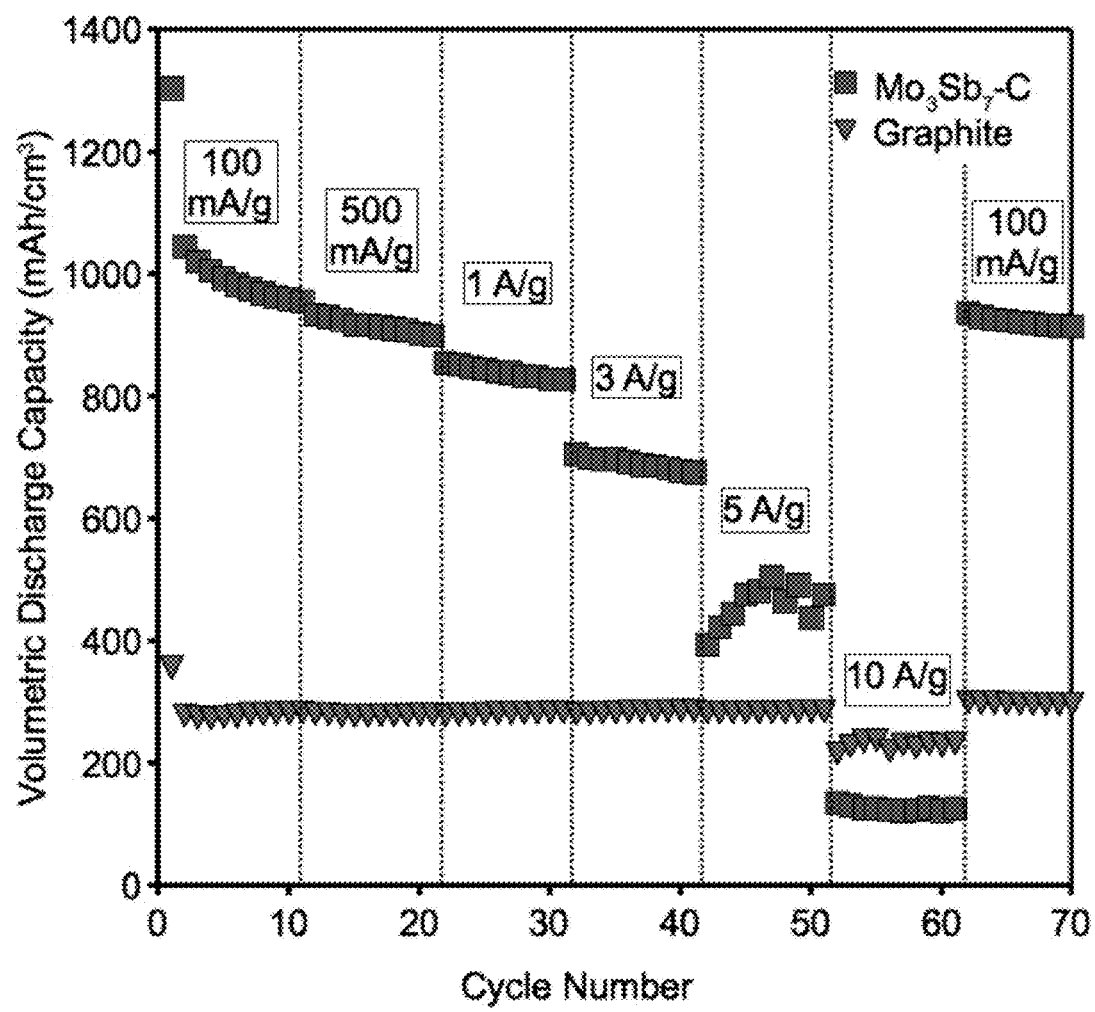
FIG. 27 provides rate capability data of $Mo_3Sb_7$—C as compared to that of graphite. Charge rates are calculated as current per gram of active electrode material. Cycling was performed at 0-2 V vs. $Li/Li^+$.

FIG. 26 compares the cyclability of Mo$_3$Sb$_7$, Mo$_3$Sb$_7$—C, and graphite at 0-2 V vs. Li/Li$^+$ at a current of 100 mA/g active material. While Mo$_3$Sb$_7$ exhibits drastic capacity fade after 20 cycles, the Mo$_3$Sb$_7$—C composite exhibits excellent cyclability to 70 cycles. Clearly, the addition of carbon to the Mo$_3$Sb$_7$ alloy improves the cycle performance significantly by acting as a conductive buffer to the volume changes during cycling. However, the capacity of the sample begins to fade around 70 cycles. Although the gravimetric capacity of the Mo$_3$Sb$_7$—C anode is less than two times of commercially available graphite, the volumetric capacity is approximately three times that of graphite due to the much higher tap density (1.75 g/cm$^3$) compared to that of graphite (~1 g/cm$^3$). FIG. 27 compares the rate capability of the Mo$_3$Sb$_7$—C composite with that of graphite. Although the volumetric capacity is higher, the Mo$_3$Sb$_7$—C composites exhibit lower rate capability than graphite, but it could be improved by optimizing the electrode fabrication process.

Example 17

EIS Analysis of Electrodes Containing Mo$_3$Sb$_7$—C Material

Electrochemical impedance spectroscopic analysis (EIS) was conducted with a Solartron SI1260 impedance analyzer by applying a 10 mV amplitude signal in the frequency range of 10 kHz to 0.001 Hz. Mo$_3$Sb$_7$—C served as the working electrode and lithium foil served as the counter and reference electrodes. The impedance response was measured after one and 20 charge-discharge cycles at 2 V vs. Li/Li$^+$.

Figures 29A, 29B, 29C, 29D:
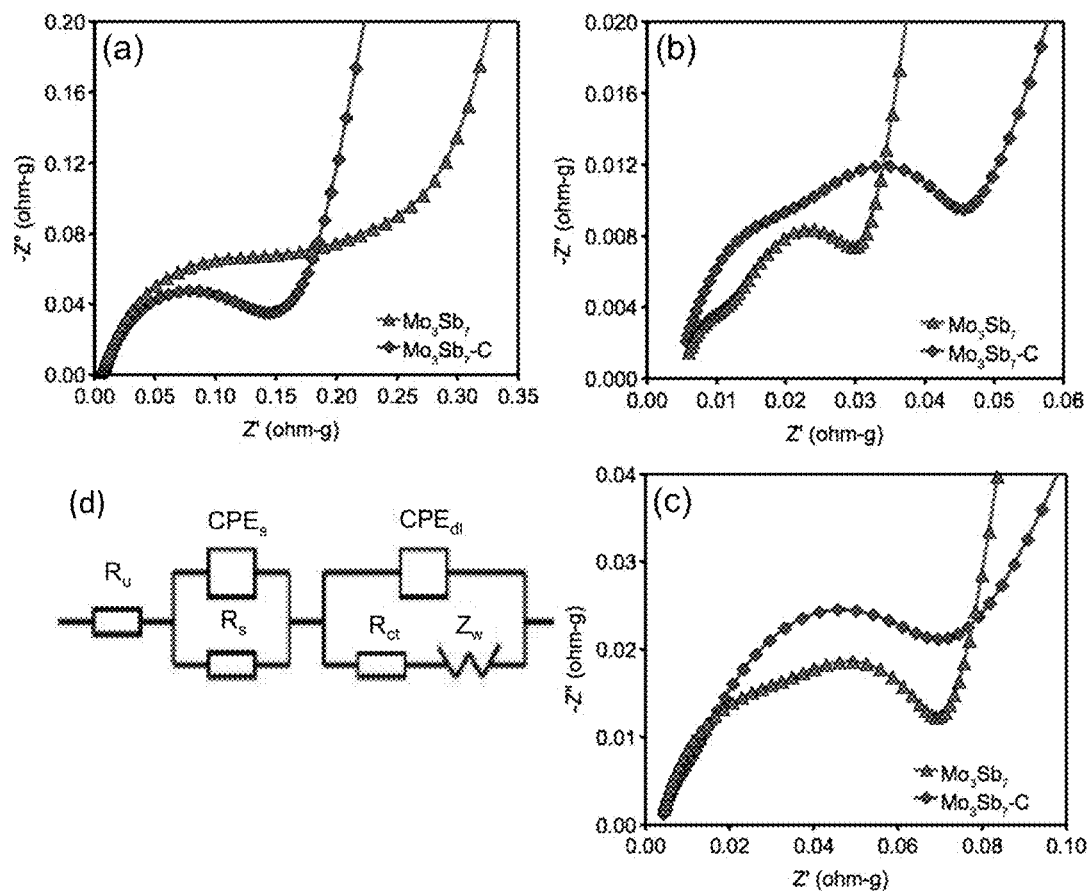
FIG. 29A provides the EIS plots of the $Mo_3Sb_7$ and $Mo_3Sb_7$—C composite materials after before cycling.
FIG. 29B provides the EIS plots of the $Mo_3Sb_7$ and $Mo_3Sb_7$—C composite materials after 1 cycle.
FIG. 29C provides the EIS plots of the $Mo_3Sb_7$ and $Mo_3Sb_7$—C composite materials after 20 cycles.
FIG. 29D provides the equivalent circuit used for the $Mo_3Sb_7$ and $Mo_3Sb_7$—C composites used to obtain the data in FIGS. 29A-C and EIS plots of the $Mo_3Sb_7$ and $Mo_3Sb_7$—C composite materials.

To gain insight into the electrochemical performance of Mo$_3$Sb$_7$ and Mo$_3$Sb$_7$—C, EIS measurements were conducted at 2 V vs Li/Li$^+$ before cycling, after the 1st cycle, and after the 20th cycle. The EIS data were analyzed based on an equivalent circuit given in FIG. 29D. In FIG. 29, $R_u$ refers to uncompensated resistance between the working electrode and the lithium reference electrode, $CPE_s$ refers to the constant phase element of the surface layer, $R_s$ refers to the resistance of the SEI layer, $CPE_{dl}$ refers to the constant phase element of the double layer, $R_{ct}$ refers to the charge-transfer resistance, and $Z_w$ refers to the Warburg impedance. Generally, the EIS spectrum can be divided into three frequency regions, i.e., low-frequency, medium-to-low-frequency, and high-frequency regions, which correspond, respectively, to the geometric capacitance of the cell, the charge-transfer reaction, and the lithium-ion diffusion through the surface layer. The EIS spectra recorded before cycling in FIG. 29 consists of one semicircle and a line. After the 1st cycle and the 20th cycle, the EIS spectra in FIG. 29 consist of two semicircles and a line. The diameter of the semicircle in the high-frequency region (lowest Z' values) is a measure of the resistance $R_s$ of the SEI layer, but is not observed for either material before cycling has been performed. The diameter of the semicircle in the medium-frequency region (middle Z' values) is a measure of the charge-transfer resistance $R_{ct}$, which is related to the electrochemical reaction between the particles or between the electrode and the electrolyte. The portion of the impedance curve that has a linear slope is related to lithium-ion diffusion in the bulk of the active material.

Before cycling, the $Mo_3Sb_7$ sample exhibits a higher $R_{ct}$ and bulk diffusion resistance than the $Mo_3Sb_7$—C sample. The semicircle corresponding to $R_s$ cannot be observed in the impedance measurements before cycling. After the first cycle, both the samples exhibit two distinct semicircles, corresponding to $R_s$ and $R_{ct}$. The $Mo_3Sb_7$—C sample shows higher $R_s$ than $Mo_3Sb_7$, due to the development of the SEI layer. The growth of the SEI layer is more pronounced in the $Mo_3Sb_7$—C sample, most likely because of the carbon. The effects of a more significant SEI layer can also be seen in the larger first cycle irreversible capacity loss for $Mo_3Sb_7$—C compared to that for the $Mo_3Sb_7$ sample (FIG. 26). $R_{ct}$ and the bulk diffusion resistance of the $Mo_3Sb_7$—C sample are higher than those of $Mo_3Sb_7$ after the first cycle, presumably because the $Mo_3Sb_7$ particles are not separated from one another by carbon. After the $20^{th}$ cycle, the bulk diffusion resistance of the $Mo_3Sb_7$ sample becomes greater than that of the $Mo_3Sb_7$—C sample because the $Mo_3Sb_7$ electrode has already begun breaking down and encountering significant capacity fade.

Example 18

Resistance of $Mo_3Sb_7$—C Material to Manganese Poisoning

Figure 28:
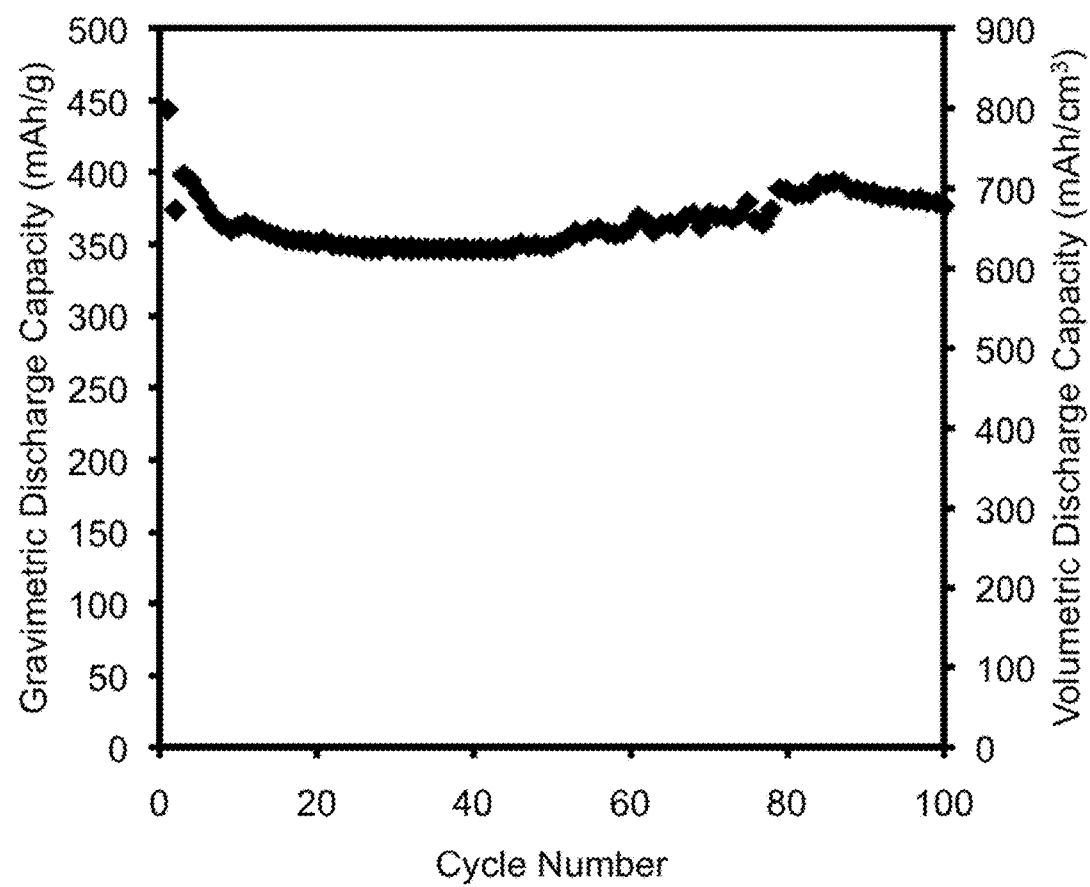
FIG. 28 provides cycle performance of a full cell with $Mo_3Sb_7$—C anode and the spinel manganese oxide cathode at a current rate of 30 mA/g active material.

Full pouch cells were also assembled with the $Mo_3Sb_7$—C composite as the anode and the spinel manganese oxide cathode to determine the resistance of the $Mo_3Sb_7$—C electrode to poisoning by the dissolved Mn from the spinel cathode. The full cell with the $Mo_3Sb_7$—C anode and manganese oxide spinel cathode shows good cyclability over 100 cycles, indicating the resistance of the $Mo_3Sb_7$—C composite to manganese poisoning (FIG. 28). The slight difference in performance between the coin cell and the full pouch cell after 70-80 cycles may be related to the differences in construction of the cells and the extent of compression and contact.

Although only exemplary embodiments of the invention are specifically described above, it will be appreciated that modifications and variations of these examples are possible without departing from the spirit and intended scope of the invention. For instance, numeric values expressed herein will be understood to include minor variations and thus embodiments "about" or "approximately" the expressed numeric value unless context, such as reporting as experimental data, makes clear that the number is intended to be a precise amount.

The invention claimed is:

1. An anode material comprising the general formula $Cu_2Sb$—$Al_2O_3$—C, wherein $Al_2O_3$—C forms a matrix containing $Cu_2Sb$.

2. An anode material comprising the general formula $M_ySb$-$M'O_x$—C,
wherein $M_ySb$ is a metal antinomide alloy and M is selected from the group consisting of copper (Cu), molybdenum (Mo), nickel (Ni), titanium (Ti), or tin (Sn), and combinations thereof,
wherein $M'O_x$ is a metal oxide and M' is selected from the group consisting of aluminum (Al), magnesium (Mg), titanium (Ti), vanadium (V), chromium (Cr), manganese (Mn), iron (Fe), cobalt (Co), nickel (Ni), zirconium (Zr), molybdenum (Mo), tungsten (W), niobium (Nb), or tantalum (Ta), and combinations thereof, and
wherein $M'O_x$—C forms a matrix containing particulate $M_ySb$ formed after the anode material has been cycled in an electrochemical cell.

3. The anode material of claim 2, wherein $M_ySb$ comprises particles with an average diameter of 500 nm or less.

4. The anode material of claim 2, wherein the matrix comprises a conductive framework of $M_y$ that supports Sb.

5. The anode material of claim 2, wherein $M_ySb$ comprises particles with an average diameter of 200 nm or less.

6. The anode material of claim 2, wherein $M_ySb$ comprises particles with an average diameter of 100 nm or less.

7. The anode material of claim 2, wherein $M_ySb$ comprises particles with an average diameter of between 1 nm and 20 nm.

8. The anode material of claim 2, wherein the anode material has a tap density of greater than 1 g/cm$^3$.

9. A rechargeable battery comprising an electrochemical cell comprising an anode comprising an anode material comprising the general formula $M_ySb$-$M'O_x$—C,
wherein $M_ySb$ is a metal antinomide alloy and M is selected from the group consisting of copper (Cu), molybdenum (Mo), nickel (Ni), titanium (Ti), or tin (Sn), and combinations thereof,
wherein $M'O_x$ is a metal oxide and M' is selected from the group consisting of aluminum (Al), magnesium (Mg), titanium (Ti), vanadium (V), chromium (Cr), manganese (Mn), iron (Fe), cobalt (Co), nickel (Ni), zirconium (Zr), molybdenum (Mo), tungsten (W), niobium (Nb), or tantalum (Ta), and combinations thereof, and
wherein $M'O_x$—C forms a matrix containing particulate $M_ySb$ formed after the anode material has been cycled in the electrochemical cell.

10. A rechargeable battery of claim 9, comprising the general formula $Cu_2Sb$—$Al_2O_3$—C, wherein $Al_2O_3$—C forms a matrix containing $Cu_2Sb$.

11. The rechargeable battery of claim 9, wherein $M_ySb$ comprises particles with an average diameter of 500 nm or less.

12. The rechargeable battery of claim 9, wherein the matrix comprises a conductive framework of $M_y$ that supports Sb.

13. The rechargeable battery of claim 9, wherein $M_ySb$ comprises particles with an average diameter of 200 nm or less.

14. The rechargeable battery of claim 9, wherein $M_ySb$ comprises particles with an average diameter of 100 nm or less.

15. The rechargeable battery of claim 9, wherein $M_ySb$ comprises particles with an average diameter of between 1 nm and 20 nm.

16. The rechargeable battery of claim 9, wherein the anode material has a tap density of greater than 1 g/cm$^3$.

17. The rechargeable battery of claim 9, wherein the anode has a gravimetric capacity of between 380 and 650 mAh/g.

18. The rechargeable battery of claim 9, wherein the anode has a volumetric capacity of between 450 and 1,000 Ah/L.

19. The rechargeable battery of claim 9, wherein the battery retains at least 70% of its gravimetric or volumetric capacity after at least 1000 cycles.

20. The rechargeable battery of claim 9, wherein the battery retains at least 70% of its gravimetric or volumetric capacity after at least 2000 cycles.

* * * * *